US012294691B2

(12) United States Patent
Tanaka et al.

(10) Patent No.: US 12,294,691 B2
(45) Date of Patent: May 6, 2025

(54) IMAGE DISPLAY APPARATUS

(71) Applicant: SONY GROUP CORPORATION, Tokyo (JP)

(72) Inventors: Akira Tanaka, Kanagawa (JP); Kazuki Yokoyama, Kanagawa (JP); Tomoya Yano, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/779,339

(22) PCT Filed: Nov. 25, 2020

(86) PCT No.: PCT/JP2020/043888
§ 371 (c)(1),
(2) Date: May 24, 2022

(87) PCT Pub. No.: WO2021/111954
PCT Pub. Date: Jun. 10, 2021

(65) Prior Publication Data
US 2022/0408076 A1    Dec. 22, 2022

(30) Foreign Application Priority Data
Dec. 3, 2019    (JP) .................... 2019-218841

(51) Int. Cl.
H04N 13/363    (2018.01)
G02B 27/01    (2006.01)
(Continued)

(52) U.S. Cl.
CPC ....... H04N 13/363 (2018.05); G02B 27/0103 (2013.01); H04N 13/111 (2018.05);
(Continued)

(58) Field of Classification Search
CPC .... H04N 13/363; H04N 13/111; H04N 13/32; H04N 13/322; H04N 2013/0092;
(Continued)

(56) References Cited

U.S. PATENT DOCUMENTS 5,760,931 A *    6/1998  Saburi ............... G02B 27/0149
                                                    359/13
7,495,828 B2 *   2/2009  Ishii ....................... G03B 21/56
                                                    359/449
(Continued)

FOREIGN PATENT DOCUMENTS

CN    108828893       11/2018
JP    H11174232 A     7/1999
(Continued)

OTHER PUBLICATIONS

International Search Report and Written Opinion prepared by the Japan Patent Office on Feb. 10, 2021, for International Application No. PCT/JP2020/043888, 2 pgs.
(Continued)

Primary Examiner — Tung T Vo
(74) Attorney, Agent, or Firm — Sheridan Ross PC

(57) ABSTRACT

An image display apparatus according to an embodiment of the present technology includes a plurality of projection units, a screen, and an image generation unit. The plurality of projection units projects image light corresponding to image data with reference to projection axes thereof and is disposed such that the projection axes face in directions different from each other along a first plane. The screen is disposed to intersect with the first plane at a first elevation angle ($\varphi_i$) and diffuses and outputs the image light projected along the first plane at a second elevation angle ($\varphi_o$) different from the first elevation angle ($\varphi_i$). The image generation unit generates the image data for displaying a plurality of viewpoint images corresponding to viewpoints at which the (Continued)

screen is observed at the second elevation angle ($\varphi_o$) on the basis of the directions of the projection axes on the first plane.

20 Claims, 19 Drawing Sheets

(51) Int. Cl.
*H04N 13/00* (2018.01)
*H04N 13/111* (2018.01)
*H04N 13/32* (2018.01)
*H04N 13/322* (2018.01)

(52) U.S. Cl.
CPC ........... *H04N 13/32* (2018.05); *H04N 13/322* (2018.05); *H04N 2013/0092* (2013.01)

(58) Field of Classification Search
CPC .. H04N 13/351; G02B 27/0103; G02B 30/33; G02B 5/32; G02B 30/00; G03B 21/62
USPC .......................................................... 348/54
See application file for complete search history.

(56) References Cited

U.S. PATENT DOCUMENTS

| | | | | |
|---|---|---|---|---|
| 2002/0141192 | A1* | 10/2002 | Tiao | ........................ G02B 17/00 362/268 |
| 2006/0181769 | A1* | 8/2006 | Kumasawa | .......... G03B 21/604 359/449 |
| 2007/0110380 | A1* | 5/2007 | Uchida | ................ G02B 5/0236 385/129 |
| 2008/0204663 | A1 | 8/2008 | Balogh | |
| 2008/0204671 | A1* | 8/2008 | Jeitner | ................... H01H 9/181 353/74 |
| 2009/0161028 | A1* | 6/2009 | Tanaka | .................. H04N 9/3194 348/E5.138 |
| 2012/0127320 | A1* | 5/2012 | Balogh | ................. H04N 13/363 353/121 |
| 2012/0162753 | A1* | 6/2012 | Tatsuno | ............... G03B 21/147 359/364 |
| 2013/0120362 | A1* | 5/2013 | Harris | .................. H04N 13/366 359/464 |
| 2014/0218699 | A1* | 8/2014 | Tatsuno | ............. G03B 21/2066 359/728 |
| 2015/0015545 | A1* | 1/2015 | Ting | ....................... G06F 3/0428 345/175 |
| 2016/0080735 | A1* | 3/2016 | Kim | ...................... G02B 6/0055 348/57 |
| 2016/0124295 | A1* | 5/2016 | Montgomery | ....... G02B 3/0006 353/38 |
| 2018/0113240 | A1* | 4/2018 | Watanabe | ............ G02B 5/0278 |
| 2021/0132480 | A1* | 5/2021 | Sinn | ...................... G03B 21/28 |
| 2023/0305299 | A1* | 9/2023 | Xu | ........................... G02B 5/26 |

FOREIGN PATENT DOCUMENTS

JP 2006-113182 4/2006
JP 2009-049872 3/2009

OTHER PUBLICATIONS

Jones et al., "Interpolating Vertical Parallax for an Autostereoscopic Three-Dimensional Projector Array," Journal of Electronic Imaging, vol. 23, No. 1, Jan. 2014, 13 pages.

* cited by examiner

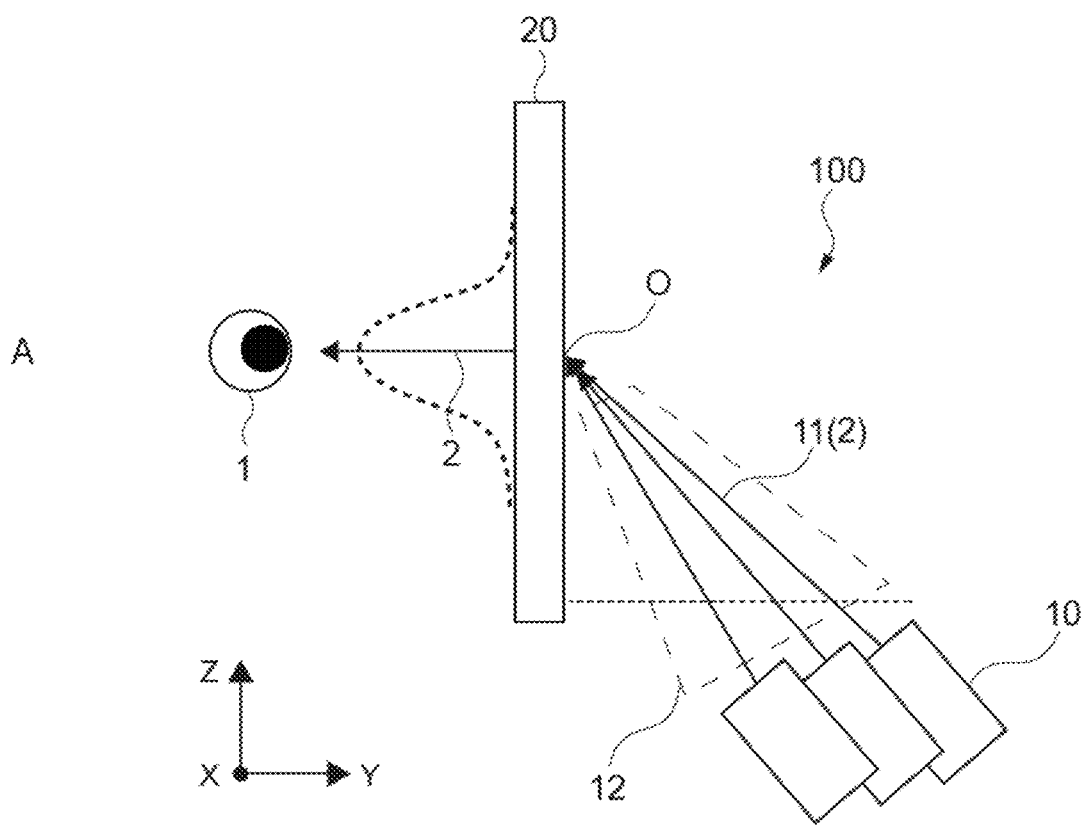
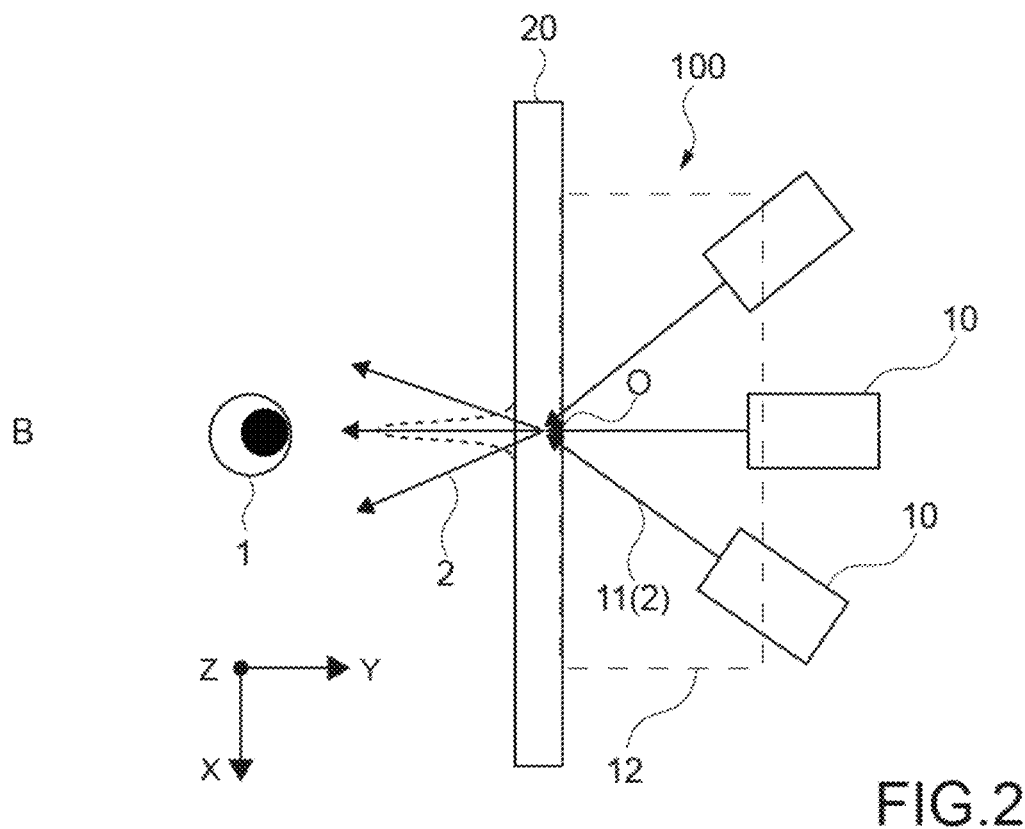
FIG.2

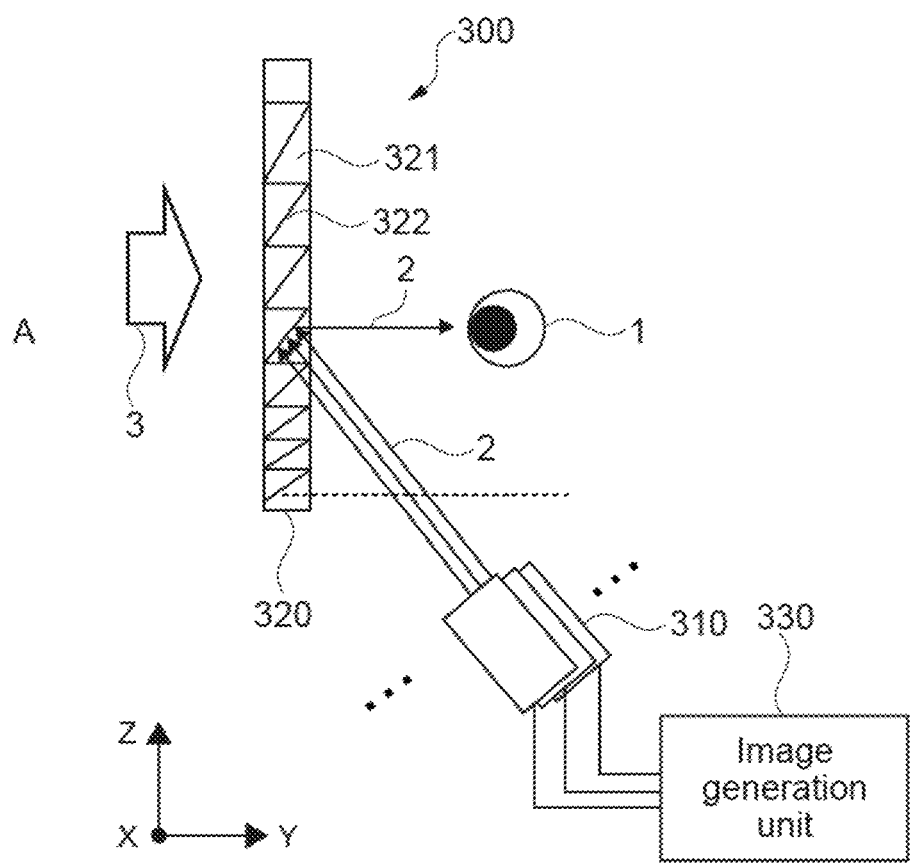
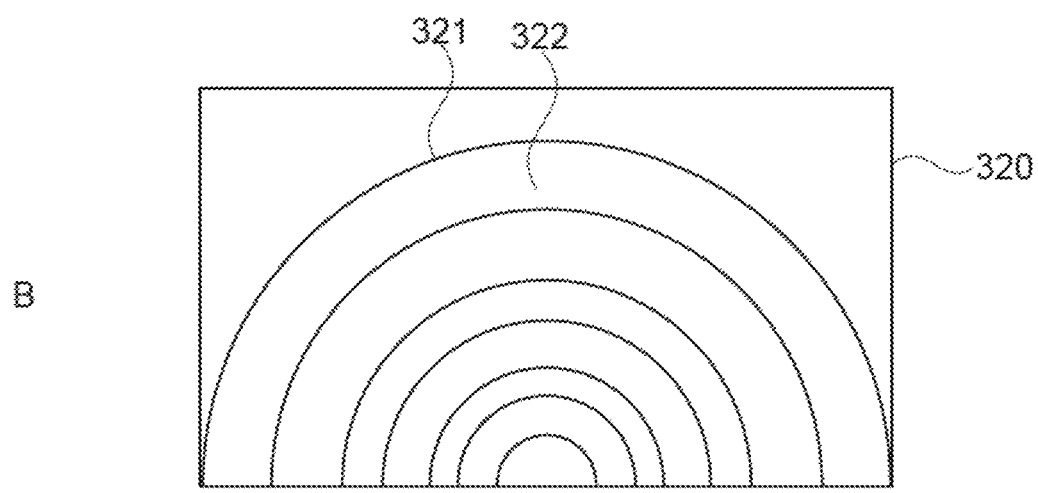
FIG.18

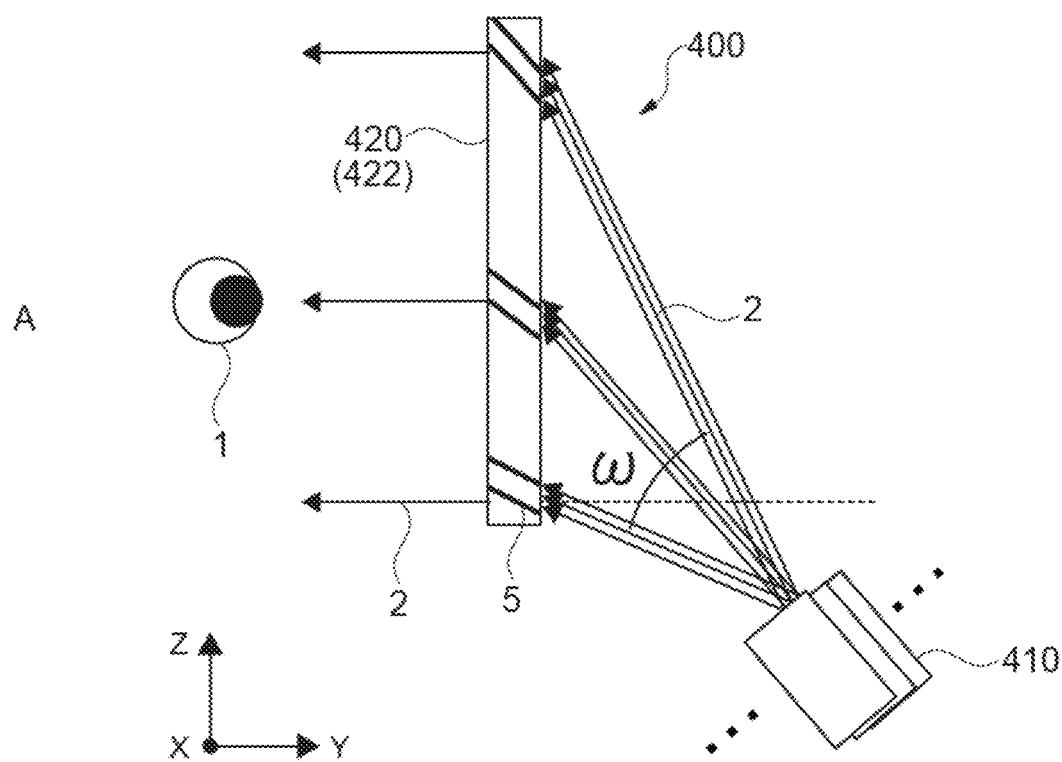
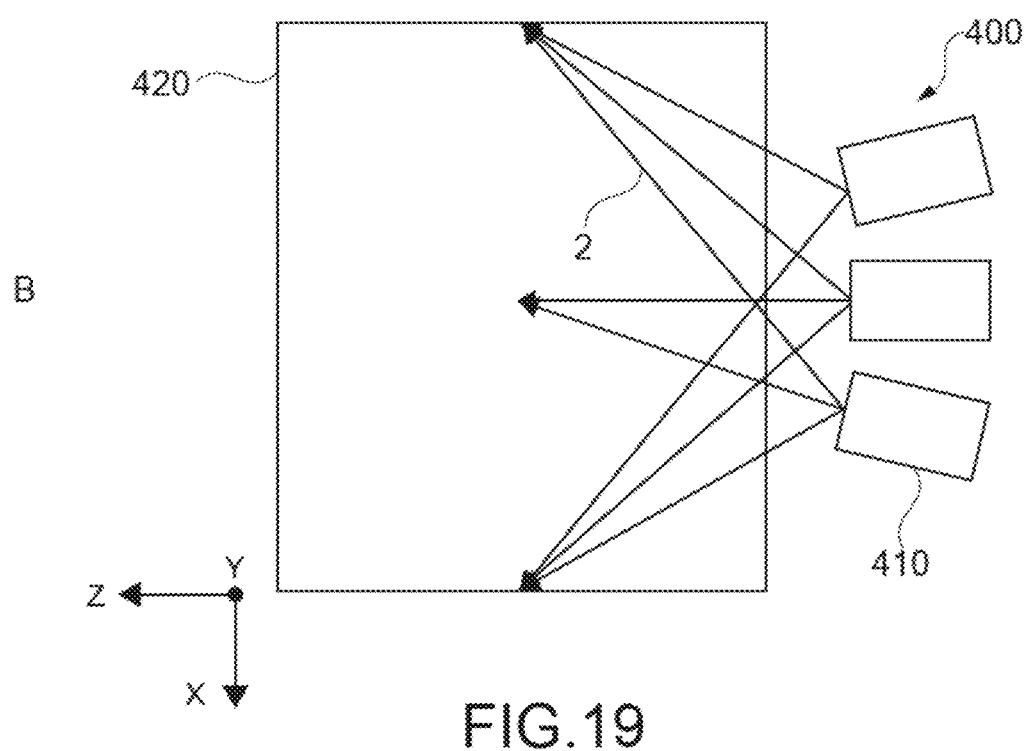
FIG.19

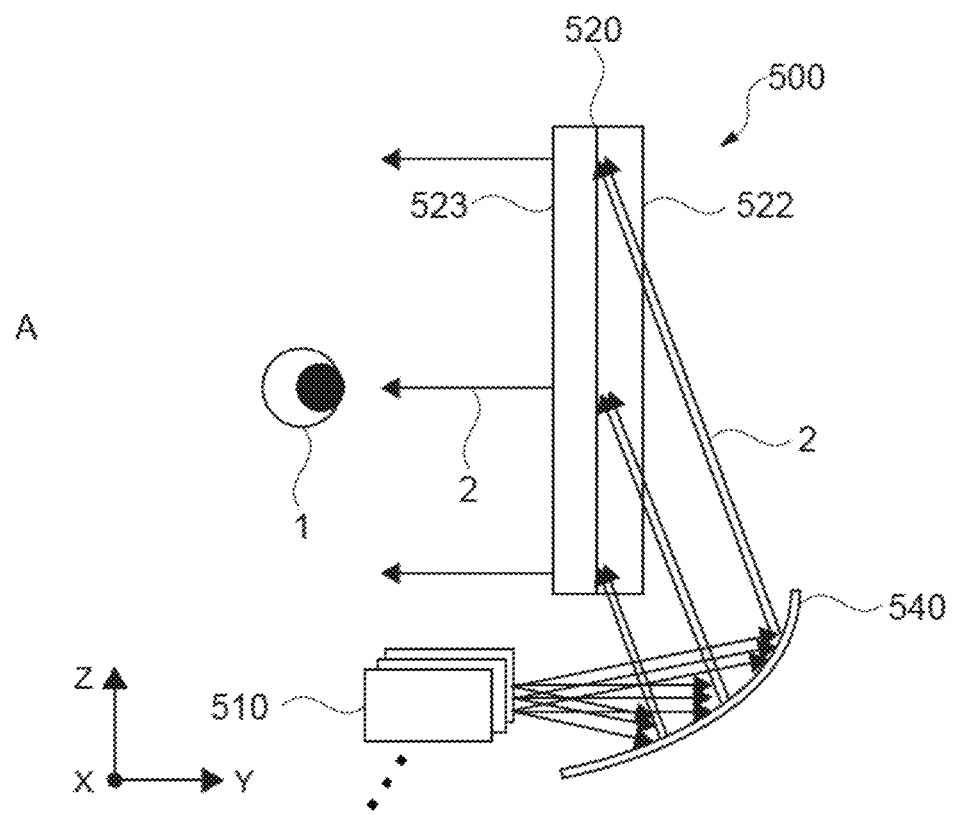
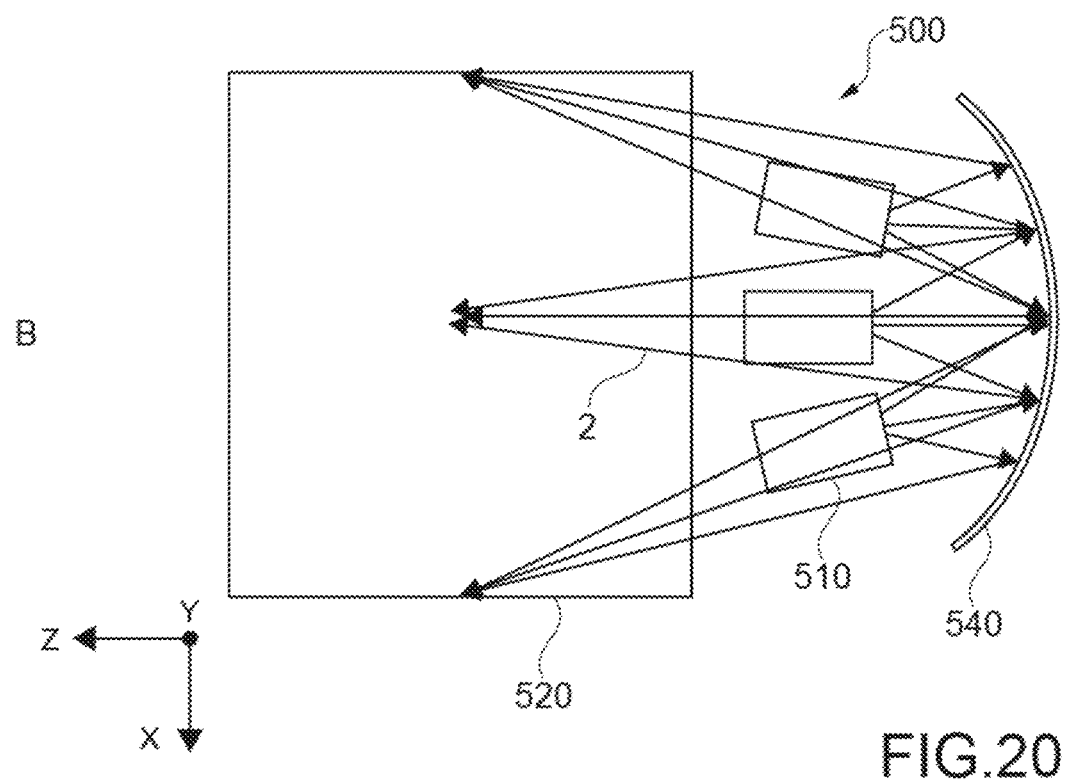
FIG.20

IMAGE DISPLAY APPARATUS

CROSS REFERENCE TO RELATED APPLICATIONS

This application is a national stage application under 35 U.S.C. 371 and claims the benefit of PCT Application No. PCT/JP2020/043888, having an international filing date of 25 Nov. 2020, which designated the United States, which PCT application claimed the benefit of Japanese Patent Application No. 2019-218841, filed 3 Dec. 2019, the entire disclosures of each of which are incorporated herein by reference.

TECHNICAL FIELD

The present technology relates to an image display apparatus applicable to stereoscopic display and the like.

BACKGROUND ART

Non-Patent Literature 1 describes a stereoscopic display apparatus that displays a stereoscopic image on a screen using a plurality of projectors. In such a stereoscopic display apparatus, the plurality of projectors is disposed in an arc shape along the horizontal direction around a screen in which a mirror is attached to the back surface of an anisotropic diffusion plate. The projected light of each projector is transformed into a vertical stripe image by the anisotropic diffusion plate while keeping the angular change in the horizontal direction. Those stripe images form an image of a display target that changes in accordance with the observation angle in the horizontal direction. This makes it possible to stereoscopically display the display target (pages 1 and 2, FIGS. 1 and 2, etc. of Non-Patent Literature 1).

CITATION LIST

Non-Patent Literature

Non-Patent Literature 1: "Interpolating vertical parallax for an autostereoscopic three-dimensional projector array" Andrew Jones, Koki Nagano, Jing Liu, Jay Busch, Xueming Yu, Mark Bolas, and Paul Debevec, Journal of Electronic Imaging, January-February 2014, Vol 23(1), 011005 1-12

DISCLOSURE OF INVENTION

Technical Problem

As described above, displaying an image corresponding to the viewpoint of a user makes stereoscopic display or the like possible. Meanwhile, there is a possibility that the apparatus size increases depending on the number of projectors, the positions thereof, and the like. For this reason, there is a demand for a technique of appropriately displaying an image corresponding to the viewpoint of a user and also reducing the size of the apparatus.

In view of the above circumstances, it is an object of the present technology to provide an image display apparatus capable of appropriately displaying an image corresponding to a viewpoint of a user and reducing the size of the apparatus.

Solution to Problem

In order to achieve the above object, an image display apparatus according to an embodiment of the present technology includes a plurality of projection units, a screen, and an image generation unit.

The plurality of projection units projects image light corresponding to image data with reference to projection axes thereof and is disposed such that the projection axes face in directions different from each other along a first plane.

The screen is disposed to intersect with the first plane at a first elevation angle and diffuses and outputs the image light projected along the first plane at a second elevation angle different from the first elevation angle.

The image generation unit generates the image data for displaying a plurality of viewpoint images corresponding to viewpoints at which the screen is observed at the second elevation angle on the basis of the directions of the projection axes on the first plane.

In such an image display apparatus, the plurality of projection units is disposed with the projection axes facing in the directions different from each other along the first plane. Further, the screen that intersects with the first plane at the first elevation angle is provided. The image light projected along the first plane from each projection unit is diffused and output at the second elevation angle different from the first elevation angle. This improves the degree of freedom in the arrangement of the projection units and the screen, for example. Further, the image data of the image light is data for displaying the viewpoint images corresponding to the viewpoints at which the screen is observed at the second elevation angle, and is generated on the basis of the directions of the projection axes on the first plane. Thus, for example, the direction in which the viewpoint image is displayed can be accurately calculated. As a result, it is possible to appropriately display an image corresponding to the viewpoint of a user and to reduce the size of the apparatus.

The image generation unit may generate the plurality of viewpoint images corresponding to viewpoints assumed from the directions of the projection axes on the first plane and generate the image data on the basis of the plurality of viewpoint images.

The image generation unit may divide each of the plurality of viewpoint images into partial images and generate, as the image data, a plurality of composite images obtained by combining the corresponding partial images for each of the plurality of projection units.

The plurality of viewpoint images may be images obtained when a display target is seen from observation orientations different from each other with a reference axis as the center. In this case, the image generation unit may set the observation orientations of the plurality of viewpoint images on the basis of the directions of the projection axes.

The image generation unit may set the reference axis to be perpendicular to a second plane that intersects with the screen at the second elevation angle.

The plurality of projection units may be disposed such that the projection axes are radially arranged in the first plane. In this case, the image generation unit may set an angular interval of the projection axes on the first plane as an angular interval of the observation orientations of the plurality of viewpoint images.

The plurality of projection units may be disposed such that the angular interval of the projection axes is constant.

The screen may diffuse the image light at a first diffusion angle along a third plane that defines the first elevation angle and the second elevation angle, and diffuse the image light at a second diffusion angle smaller than the first diffusion angle along a fourth plane perpendicular to the third plane.

The screen may be configured such that a diffusion distribution of the image light along the fourth plane is a distribution of a top hat shape.

The screen may include a diffractive optical element or a Fresnel lens element.

The screen may be a transmissive screen or a reflective screen.

The screen may be a transparent screen having light transparency.

The screen may be disposed along a vertical direction or a horizontal direction.

The screen may be disposed along the vertical direction.

The second elevation angle may be set to an angle indicating the horizontal direction.

Each of the plurality of projection units may project the image light at a predetermined angle of view with the projection axis as the center along a third plane that defines the first elevation angle and the second elevation angle.

The screen may be configured to diffuse and output, at the second elevation angle, the image light projected at the predetermined angle of view.

The screen may include a diffractive optical element in which interference fringes are recorded, and may be configured such that pitches of the interference fringes on a surface of the diffractive optical element are uniform and an angle formed by the surface of the diffractive optical element and the interference fringes changes within the diffractive optical element in a continuous or stepwise manner to satisfy a Bragg condition with respect to the image light.

The plurality of projection units may be disposed outside an angular range in which the plurality of viewpoint images displayed on the screen is visible.

The image display apparatus may further include an optical element that collimates the image light projected from the plurality of projection units and makes the image light incident on the screen at the first elevation angle.

The optical element may include a free-form mirror.

BRIEF DESCRIPTION OF DRAWINGS

FIG. 2 shows schematic diagrams of an exemplary arrangement of projectors with respect to a screen.

FIG. 18 shows schematic diagrams showing a configuration example of an image display apparatus according to a third embodiment.

FIG. 19 shows schematic diagrams showing a configuration example of an image display apparatus according to a fourth embodiment.

FIG. 20 shows schematic diagrams showing a configuration example of an image display apparatus according to a fifth embodiment.

MODE(S) FOR CARRYING OUT THE INVENTION

Embodiments according to the present technology will be described below with reference to the drawings.

First Embodiment

[Configuration of Image Display Apparatus]

Figure 1:
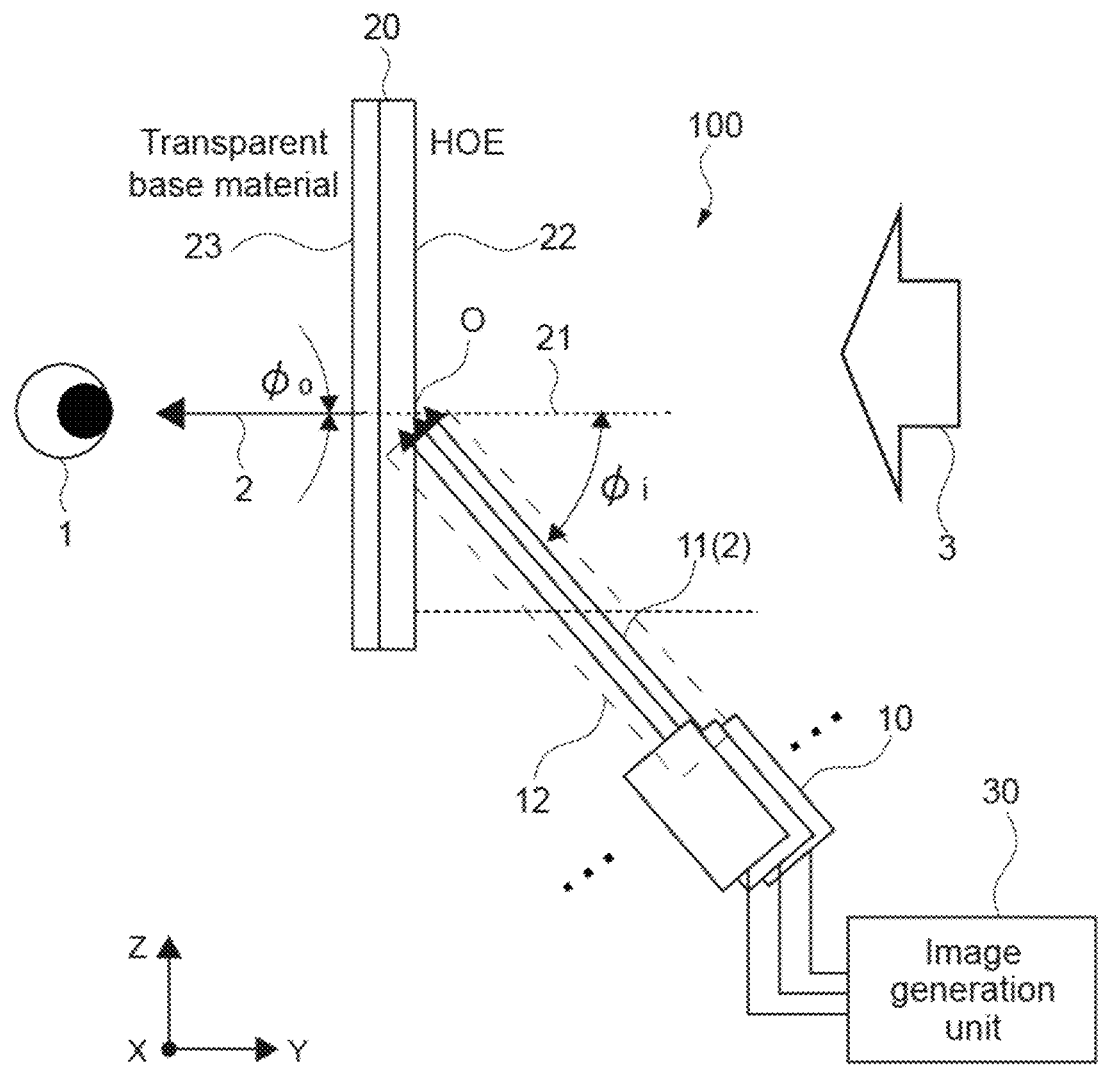
FIG. 1 is a schematic diagram showing a configuration example of an image display apparatus according to a first embodiment of the present technology.

FIG. 1 is a schematic diagram showing a configuration example of an image display apparatus according to a first embodiment of the present technology. An image display apparatus 100 includes a plurality of projectors 10, a screen 20, and an image generation unit 30. The image display apparatus 100 is an apparatus for displaying, on the screen 20, an image corresponding to a viewpoint 1 of a user who observes the screen 20. For example, the image displayed on the screen 20 varies depending on the position of the viewpoint 1 with respect to the screen 20, i.e., the angle at which the user views the screen 20.

Hence, a plurality of images is displayed on the screen 20 of the image display apparatus 100 in accordance with the viewpoint 1 of the user. This makes it possible to perform stereoscopic display or the like of a display target. In the following, an image displayed in accordance with the viewpoint 1 of the user will be referred to as a viewpoint image. Note that the viewpoint image includes a still image and a moving image (video).

As shown in FIG. 1, in this embodiment, the flat plate-shaped screen 20 is disposed along the vertical direction, and the plurality of projectors 10 is disposed diagonally below the screen 20. Further, the image generation unit 30 generates image data for displaying a plurality of viewpoint images. On the basis of the image data, image light is projected from each projector 10 onto the screen 20, and a plurality of viewpoint images is displayed.

In the following, the directions parallel to the screen 20 and perpendicular to each other will be described as an X direction and a Z direction. Of those, the Z direction corresponds to the vertical direction. Further, the direction perpendicular to the X direction and the Z direction will be described as a Y direction. Thus, the in-plane direction of the XY plane is the horizontal direction perpendicular to the vertical direction (Z direction).

FIG. 2 shows schematic diagrams of an exemplary arrangement of the projectors 10 with respect to the screen 20. A of FIG. 2 and B of FIG. 2 schematically show a side view of the image display apparatus 100 as viewed along the X direction and a top view of the image display apparatus 100 as viewed along the Z direction, respectively.

Each of the plurality of projectors 10 projects image light 2 corresponding to the image data with a projection axis 11 as a reference. Here, the projection axis 11 is an axis serving as a reference when the image light 2 is projected, and is typically an axis serving as the center of the angle of view of the projector 10 (angle-of-view center line). In other words, the projection axis 11 can also be an optical path of the image light 2 for displaying the central pixel of the image projected by the projector 10. In addition, the optical axis of a projection optical system such as a projection lens mounted on the projector 10 can be regarded as the projection axis 11. The image data is data for specifying the luminance of color of each pixel of the image formed by the image light 2. In this embodiment, the plurality of projectors 10 corresponds to a plurality of projection units.

The plurality of projectors 10 is also disposed such that the projection axes 11 face in directions different from each other along a projection reference plane 12. The projection reference plane 12 is a reference plane for disposing each projector 10. The projection axes 11 are faced in different directions along the projection reference plane 12 in such a manner, so that it is possible to display different images for the respective orientations in which the screen 20 is observed. In A of FIG. 2 and B of FIG. 2, the projection reference plane 12 is schematically shown as an area of rough dotted lines. Note that, in order to show the arrangement relationship of the projectors 10 with respect to the projection reference plane 12, A of FIG. 2 shows the shifted arrangement of the projection reference plane 12, the projectors 10, and the like. In actuality, the projection reference plane 12 is set as a plane along the X direction. In this embodiment, the projection reference plane 12 corresponds to a first surface.

As shown in B of FIG. 2, in this embodiment, the plurality of projectors 10 is disposed such that the projection axes 11 are radially arranged in the projection reference plane 12. The projection axes 11 are radially disposed so as to pass through a predetermined point (reference point O) on the projection reference plane 12, for example. As a result, it is possible to display a viewpoint image with respect to various orientations centered on the reference point O.

In this embodiment, the reference point O is provided on an intersection line at which the projection reference plane 12 and the screen 20 intersect. With this reference point O as the center, each projector 10 is positioned at a predetermined distance away from the reference point O such that the projection axes 11 are radially arranged. In other words, it can also be said that the plurality of projectors 10 is disposed on the projection reference plane 12 in an arc shape centered on the reference point O on the screen 20. Thus, the projection distance from each projector 10 becomes equal, and it is possible to accurately display the viewpoint image.

Further, the plurality of projectors 10 is disposed such that the angular interval of the projection axes 11 is constant. Here, the angular interval of the projection axes 11 is the angle formed by the projection axes 11 adjacent to each other in the projection reference plane 12. Therefore, in the projection reference plane 12, the projection axes 11 are radially arranged at mutually equal angular intervals. Thus, making the angular intervals of the projection axes 11 constant makes it possible to, for example, display a viewpoint image or the like that changes at a constant angle, and to achieve natural stereoscopic display or the like.

FIGS. 1 and 2 schematically show three projectors 10 disposed such that the respective projection axes 11 are radially arranged. The number of projectors 10 mounted on the image display apparatus 100 is not limited, and the present technology is also applicable to the case where, for example, two projectors 10 are used or four or more projectors 10 are used. Further, the arrangement parameters of each projector 10 (the angular interval of the projection axis 11, the position of the reference point O, the distance from the reference point O, etc.) are not limited. Each arrangement parameter may be appropriately set, for example, such that the viewpoint image can be displayed at a desired accuracy.

Note that, in the image display apparatus 100, images (image light 2) projected from the plurality of projectors 10 are used to display one viewpoint image. Therefore, one projector 10 does not project one viewpoint image, and the image data input to each projector 10 is not data for displaying one viewpoint image. This point will be described in detail below with reference to FIG. 4 and the like.

As the projector 10, a laser projector using a laser light source or the like is used. For example, a scan-type laser projector for scanning RGB or monochromatic laser light to project an image, or a projection-type laser projector using a liquid crystal light valve or the like is used. In this embodiment, a screen 20 (HOE) for diffracting the image light 2 to control the optical path thereof is used. Using a laser light source makes it possible to display a viewpoint image 40 using color light with a narrow wavelength width, to improve the diffraction efficiency in the screen 20, and to increase the display luminance of the viewpoint image 40. Further, it is possible to avoid blurring, color deviation, or the like of the image, which is due to the color dispersion accompanied by the diffraction of the image light 2.

Referring back to FIG. 1, the screen 20 diffuses the image light 2 projected from the plurality of projectors 10 to display a plurality of viewpoint images. In this embodiment, the screen 20 is configured as a transparent screen having light transparency. For example, background light 3 output from the background of the screen 20 passes through the screen 20 and reaches the viewpoint 1 of the user. As a result, it is possible to display a viewpoint image superimposed on the background, and it is possible to achieve stereoscopic display as if a display target exists in an actual space, for example. Further, the screen 20 is a transmissive screen that transmits the projected image light to display an image. Therefore, the user will observe the viewpoint image from the side opposite to the side where the projector 10 projects the image light 2.

As described above, in this embodiment, the flat plate-shaped screen 20 is disposed along the vertical direction (XZ plane). The projection reference plane 12 is set so as to intersect with the screen 20 at an incident elevation angle $\varphi_i$.

The elevation angle with respect to the screen 20 is an angle formed by a normal line 21 of the screen 20 and a target plane (or line) on the vertical plane (YZ plane) perpendicular to the screen 20, for example. In FIG. 1, the angle between the normal line 21 of the screen 20 and the projection reference plane 12 is schematically shown as the incident elevation angle $\varphi_i$. For example, the above-mentioned elevation angle of the projection axis 11 of each projector 10 with respect to the screen 20 is an angle formed by the axis obtained by projecting each projection axis 11 onto the YZ plane and the normal line of the screen 20 on the YZ plane.

In such a manner, the screen 20 is disposed so as to intersect with the projection reference plane 12 at the incident elevation angle $\varphi_i$. Therefore, the elevation angles of the image light 2 projected from the respective projectors 10 on the optical path on the projection reference plane 12 with respect to the screen 20 are all the incident elevation angles $\varphi_i$. Note that, for example, the angle formed by the screen 20 itself and a target surface (or line) may be used as the elevation angle with respect to the screen 20. It can also be said that the incident elevation angle $\varphi_i$ is a projection angle of each projector 10 with respect to the screen 20. In this embodiment, the incident elevation angle $\varphi_i$ corresponds to a first elevation angle.

The screen 20 is configured to diffuse and output the image light 2 projected along the projection reference plane 12 at an output elevation angle $\varphi_o$ different from the incident elevation angle $\varphi_i$. As will be described later, the image light incident on the screen 20 is diffused at a predetermined diffusion angle. The output elevation angle is, for example, an elevation angle formed by the output direction (peak direction), in which the intensity of the diffused image light 2 reaches a peak, and the normal line 21 of the screen 20. Therefore, the image light 2 incident on the screen 20 along the projection reference plane 12 is diffused and output such that the elevation angle with respect to the screen 20 changes. As a result, the screen 20 can control the optical path of the image light 2 such that the output direction (peak direction) of the image light 2 is directed in any direction different from the direction of the projection axis 11. This makes it possible to freely set the elevation angle at which the viewpoint image is displayed.

In this embodiment, the output elevation angle $\varphi_o$ is set to an angle indicating the horizontal direction. In other words, the output elevation angle $\varphi_o$ is set to 0, and the peak direction of the diffused image light 2 is the normal-line direction of the screen 20. In FIG. 1, the angle of the peak direction that coincides with the normal line of the screen 20 is schematically shown as the output elevation angle $\varphi_o$. In such a manner, in the image display apparatus 100, the image light 2 is output along the horizontal direction from the screen 20 disposed along the vertical direction. As a result, the user can easily observe the viewpoint image displayed on the screen 20. In this embodiment, the output elevation angle $\varphi_o$ corresponds to a second elevation angle.

In this embodiment, the screen 20 includes a transmissive hologram 22 and a transparent base material 23. As shown in FIG. 1, in this embodiment, the screen 20 is constituted by attaching the transmissive hologram 22 to one surface of the transparent base material 23. Further, the screen 20 is disposed with the transmissive hologram 22 facing the plurality of projectors 10.

The transmissive hologram 22 is a transmissive holographic optical element (HOE). The HOE is an optical element using a hologram technique, and diffracts the light by interference fringes recorded thereon in advance to control the light traveling direction (optical path control). The transmissive HOE is controllable in the diffraction and transmission direction in which the light is diffracted and transmitted. The transmissive hologram 22 is an example of a diffractive optical element.

The transmissive hologram 22 is configured to diffract and transmit the light incident in a specific angular range and transmit the light in other angular ranges. For example, the image light 2, which is incident in a specific angular range on the projection surface facing the plurality of projectors 10 (the surface on the right side in the figure), is output from the output surface opposite to the projection surface (the surface on the left side in the figure) at an output angle corresponding to the incident angle. Further, the light incident at an incident angle other than the specific angular range is transmitted through the transmissive hologram 22 almost without undergoing diffraction due to the interference fringes.

In this embodiment, in the transmissive hologram 22, the interference fringes are exposed such that the image light 2 incident at the incident elevation angle $\varphi_i$ is output at the output elevation angle $\varphi_o$. The transmissive hologram 22 configured as described above shows a diffraction efficiency distribution in which the diffraction efficiency peaks at the incident elevation angle $\varphi_i$, for example. The image light 2 incident at an elevation angle close to the incident elevation angle $\varphi_i$ is output at an elevation angle close to the output elevation angle $\varphi_o$, for example.

Therefore, the image light 2 projected from each projector 10 at a predetermined angle of view centered on the incident elevation angle $\varphi_i$ is output from the screen 20 in a predetermined elevation angle range including the output elevation angle $\varphi_o$. Note that the light incident at an elevation angle sufficiently distant from the incident elevation angle $\varphi_i$ is transmitted through the transmissive hologram 22 without being diffracted as described above. Thus, it can be said that the transmissive hologram 22 is an element that selectively diffracts the image light 2 projected from the projector 10 and controls the elevation angle of the optical path of the image light 2.

If the elevation angle of the optical path of the image light 2 changes, the azimuth angle of the optical path of the image light 2 with respect to the screen 20 changes before and after the image light 2 is incident on the screen 20. Here, the azimuth angle with respect to the screen 20 is, for example, an angle formed by the normal line 21 of the screen 20 and the target line (or plane) on the horizontal plane perpendicular to the screen 20 (XY plane). For example, if the azimuth angle is defined with reference to the screen 20, the azimuth angle of the optical path after the image light passes through the screen 20 changes in accordance with the change in the elevation angle of the optical path of the image light 2. The change in the azimuth angle of the image light 2 will be described later in detail with reference to FIG. 6 and the like.

Further, in the transmissive hologram 22, such interference fringes that diffuse light of a specific wavelength by exposure are recorded. Specifically, the interference fringes capable of diffusing the image light 2 are formed. Diffusing the image light 2 makes it possible to display the pixels constituting the viewpoint image. Thus, a transmissive screen is constituted. The screen 20 for displaying the images from the plurality of projectors 10 needs different diffusion characteristics from those of a screen used as a two-dimensional display. For example, the screen for a two-dimensional display has a structure of isotropic diffusion or in which the diffusion angle is large in the horizontal direction. In contrast, in the screen 20 according to the present technology, the transmissive hologram 22 is configured so as to have different diffusion characteristics in the vertical direction and the horizontal direction.

In this embodiment, the transmissive hologram 22 (screen 20) diffuses the image light 2 at a vertical diffusion angle α along the vertical plane (YZ plane) that defines the incident elevation angle $\varphi_i$ and the output elevation angle $\varphi_o$, and diffuses the image light 2 at a horizontal diffusion angle β smaller than the vertical diffusion angle α along the horizontal plane (XY plane) perpendicular to the vertical plane. In other words, in the transmissive hologram 22, the diffusion angle in the vertical direction (vertical diffusion angle α) is set to a narrower angle than the diffusion angle in the horizontal direction (horizontal diffusion angle β). In this embodiment, the vertical plane (YZ plane) and the horizontal plane (XY plane) correspond to a third plane and a fourth plane, respectively, and the vertical diffusion angle α and the horizontal diffusion angle β correspond to a first diffusion angle and a second diffusion angle, respectively.

Figure 3:
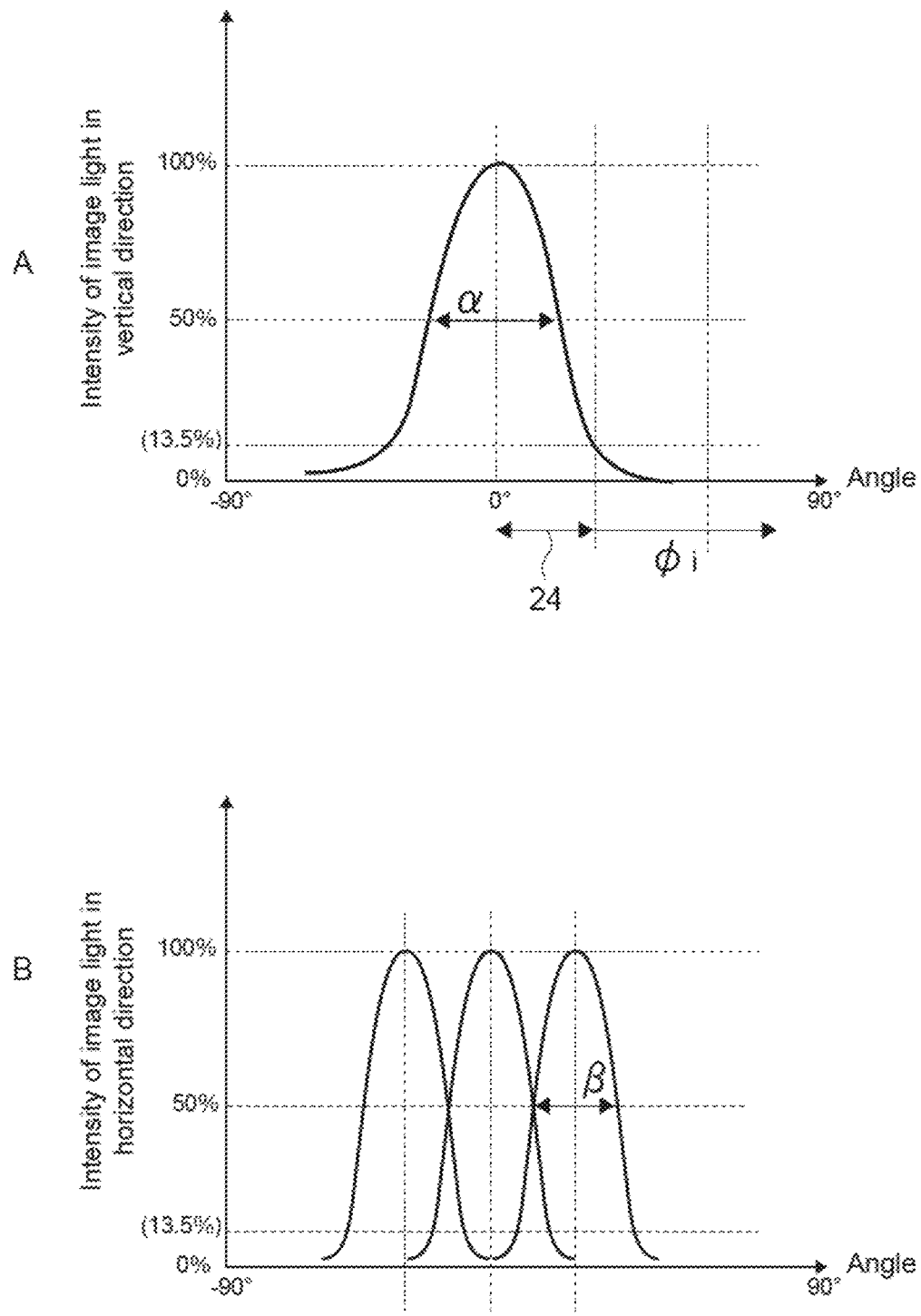
FIG. 3 shows schematic graphs of exemplary diffusion characteristics of a transmissive hologram.

FIG. 3 shows schematic graphs of exemplary diffusion characteristics of the transmissive hologram 22. In FIG. 3, the diffusion characteristics of the Gaussian distribution in which the intensity of the image light 2 varies gently with respect to the angle will be described. A of FIG. 3 is a graph showing the diffusion characteristics in the vertical direction of the transmissive hologram 22. The vertical axis of the graph is the intensity of the image light 2 diffused along the vertical plane, and the horizontal axis is the elevation angle with respect to the screen 20. As shown in A of FIG. 3, the image light 2, which is incident at the incident elevation angle $\varphi_i$ and then diffused and output at the output elevation angle $\varphi_o=0$, is diffused at the vertical diffusion angle α. Here, the vertical diffusion angle α is, for example, an angular range of the elevation angle in which the diffraction efficiency has a predetermined value (e.g., 50% of the intensity peak etc.) or more. The vertical diffusion angle α is set to an angle larger than the horizontal diffusion angle β shown in B of FIG. 3.

In the image display apparatus 100, the image light 2 from one projector 10 covers the viewing angle in the vertical direction (V direction). Thus, a sufficiently wider vertical diffusion angle α than the horizontal diffusion angle β is set for the transmissive hologram 22. This makes it possible to appropriately display the viewpoint image, for example, even if the viewpoint 1 of the user is moved up and down somewhat from the horizontal direction.

Further, in this embodiment, the arrangement position of each projector 10 is set with reference to the diffusion characteristics in the vertical direction. For example, each projector 10 is disposed at an angular position outside the tail portion of the intensity of the image light 2 diffused in the vertical direction. In the example shown in A of FIG. 3, assuming that the angular range in which the visible light intensity is 13.5% ($1/e^2$) or less is a visible elevation angle range 24, the incident elevation angle $\varphi_i$ is set so as to be outside the visible elevation angle range 24. Note that the incident elevation angle $\varphi_i$ may be set with reference to an angular range (vertical diffusion angle α) in which the visible light intensity is 50% or more.

The visible elevation angle range 24 is a range in which the viewpoint image 40 displayed on the screen 20 (transmissive hologram 22) is visible. Thus, for example, as shown in FIG. 1, setting the angular position (incident elevation angle $\varphi_i$) of the projector 10 outside the visible elevation angle range 24 makes it possible to arrange the projector 10 at a position that is not visible from the viewpoint 1 of the user, that is, outside the lower end of the screen 20 (fine dotted lines in the figure). As a result, it is possible to avoid a situation in which the projector 10 is visible together with the viewpoint image 40, or a user viewing the viewpoint image 40 visually recognizes the direct light of the projector 10.

Note that instead of setting the incident elevation angle $\varphi_i$ in accordance with the diffusion characteristics in the vertical direction, a diffusion angle distribution in the perpendicular direction (vertical diffusion angle α or the like) can also be set in accordance with the incident elevation angle $\varphi_i$. Thus, in this embodiment, the plurality of projectors 10 is disposed outside the angular range in which the plurality of viewpoint images 40 displayed on the screen 20 is visible.

B of FIG. 3 is a graph showing the diffusion characteristics in the horizontal direction of the transmissive hologram 22. The vertical axis of the graph is the intensity of the image light 2 diffused along the horizontal plane, and the horizontal axis is the azimuth angle with respect to the screen 20. B of FIG. 3 shows the diffusion characteristics in the horizontal direction for the image light 2 incident along the projection axis 11 of each projector 10. The image light 2 incident along each projection axis 11 is diffused at the horizontal diffusion angle β with the elevation angle of the projection axis 11 with respect to the screen 20 as a peak. Here, the horizontal diffusion angle β is, for example, an angular range of the azimuth angle in which the diffraction efficiency has a predetermined value (e.g., 50% or more of the intensity peak etc.) or more.

If the plurality of projectors 10 is disposed side by side in an array as shown in FIGS. 1 and 2, for the horizontal direction, the horizontal diffusion angle β is set to a narrow angle such that the images (viewpoint images) displayed toward different orientations are separated from each other. This makes it possible to avoid crosstalk or the like observed in a state where the images displayed toward different orientations are mixed at the viewpoint 1 at which the screen 20 is observed from each orientation. Note that the horizontal diffusion angle β is set in accordance with the angular interval of the projection axes 11 of the respective projectors 10, the angle of the image light 2 diffracted in the horizontal direction, or the like. This makes it possible to display a high-resolution video on the transparent screen 20.

As the transmissive hologram 22, a volume-type HOE in which the interference fringes are recorded inside the element is used. Further, a relief-type (embossed-type) HOE in which the interference fringes are recorded using irregularities or the like of the element surface, or the like may be used. Those HOEs are exemplary diffractive optical elements (DOEs). Thus, the screen 20 is configured using the diffractive optical element. Note that, in addition to the HOE in which the interference fringes are recorded to diffract light, a diffractive optical element of the type that diffracts light using a diffraction grating or the like of a predetermined pattern may be used, for example.

Referring back to FIG. 1, the transparent base material 23 is a transparent member having light transmittance, and functions as a support member for supporting the transmissive hologram 22. The transparent base material 23 is formed of, for example, a plate-shaped material having transparency (plastic material such as acrylic, glass, or the like). The specific configuration of the transparent base material 23 is not limited. For example, the transparent base material 23 may be formed of a sufficiently transparent material having a high transmittance, a translucent material having a predetermined transmittance (e.g., 30%), or the like.

Alternatively, the screen 20 may be formed by sandwiching the transmissive hologram 22 between two transparent base materials 23. In this case, the strength of the screen 20 is increased to improve the robustness, and the resistance to scratches is also obtained, so that the reliability of the screen 20 is improved. Further, an anti-reflection film or the like may be provided on the surface of the screen 20 (the transmissive hologram 22 and the transparent base material 23). Thus, for example, it is possible to suppress ghost light due to the secondary diffraction of the image light 2 by the HOE, the surface reflected light of the environmental light (external light), the diffracted light of unintentional environmental light, and other stray light. In addition, the specific configuration of the screen 20 is not limited.

The image generation unit 30 generates image data to be input to the plurality of projectors 10. Specifically, image data for displaying a plurality of viewpoint images corresponding to the viewpoint 1 at which the screen 20 is observed at the output elevation angle $\varphi_o$ is generated on the basis of the directions of the projection axes 11 on the projection reference plane 12. As described above, before and after the image light 2 is incident on the screen 20, the azimuth angle of the optical path of the image light 2 with respect to the screen 20 is changed. Using the directions of the projection axes 11 on the projection reference plane 12 makes it possible to generate image data corresponding to such a change in azimuth angle. The specific operation of the image generation unit 30 will be described later in detail with reference to FIG. 7 and the like.

Figure 4:
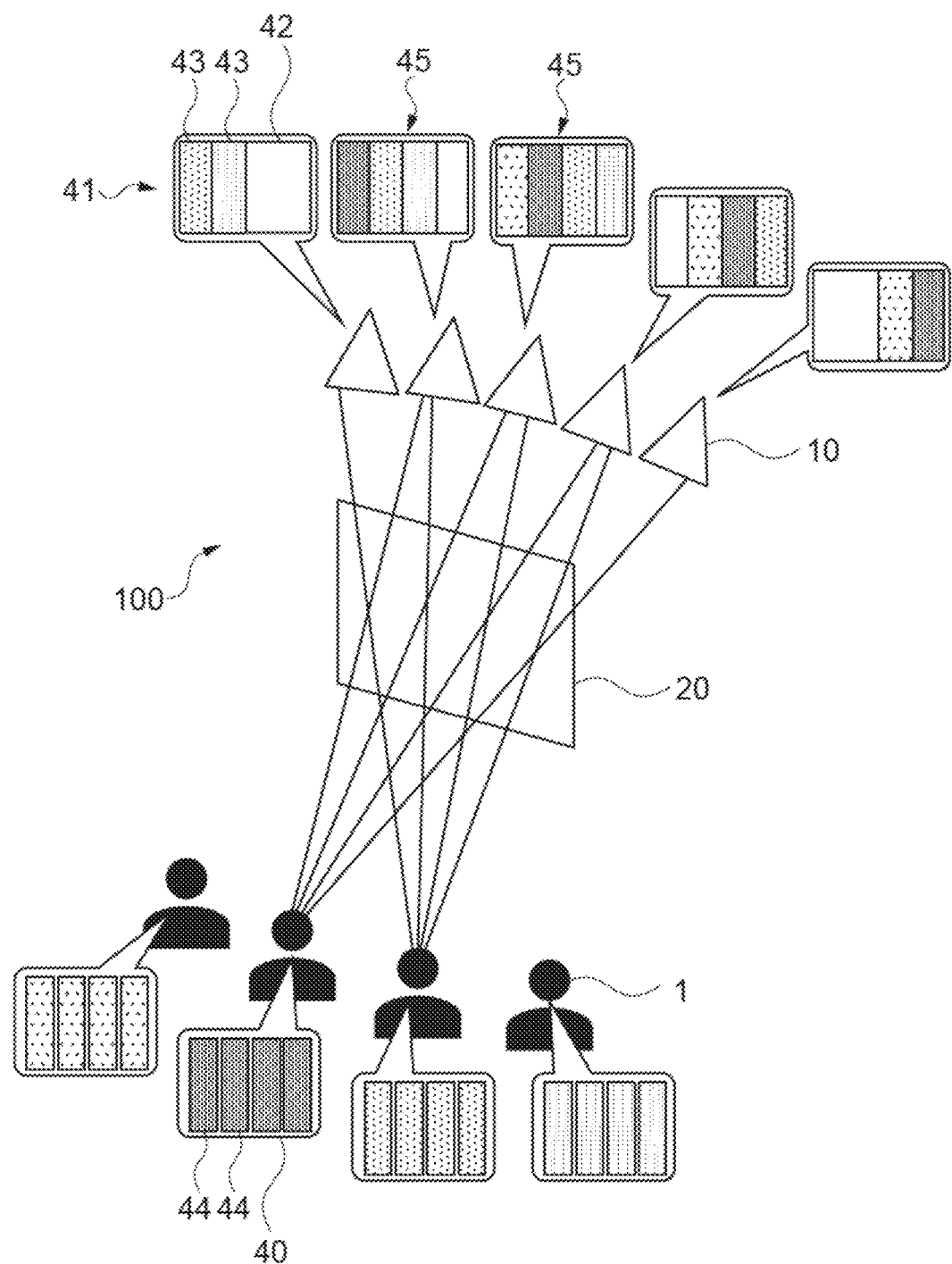
FIG. 4 is a schematic diagram for describing a method of displaying a viewpoint image.

FIG. 4 is a schematic diagram for describing a method of displaying a viewpoint image. FIG. 4 schematically shows a plurality of viewpoint images 40 displayed in the mutually different orientations and image data 41 for displaying those viewpoint images 40. Here, a basic method of displaying the viewpoint images 40 using the plurality of projectors 10 will be described.

A display region 42 of each projector 10 is divided into a plurality of divided regions 43 along the longitudinal direction (vertical direction in the screen 20). A partial image 44 obtained by dividing the viewpoint image 40 along the longitudinal direction is assigned to each divided region 43. For example, the direction in which each pixel of the image is projected is a different orientation for each pixel. Therefore, by using the screen 20 of the narrow horizontal diffusion angle β as shown in B of FIG. 3, it is possible to display the partial images 44, which are displayed in the plurality of divided regions 43, toward the mutually different orientations.

Using such characteristics, the plurality of projectors 10 assigns the partial images 44 of the viewpoint images 40, which are desired to be seen from the viewpoints 1 of the user, and displays them in the divided regions 43 corresponding to the images (display regions 42) projected by the respective projectors 10. Therefore, the image data 41 to be input to each projector 10 is a composite image 45 obtained by combining the partial images 44 assigned to the divided regions 43.

In FIG. 4, for example, the viewpoint image 40 observed at the second viewpoint 1 from the left in the figure is an image obtained by combining the partial images 44 projected from the second, third, fourth, and fifth projectors 10 from the left in the figure. Similarly, the viewpoint image 40 observed at another viewpoint 1 is also an image obtained by combining the partial images 44 projected by a plurality of projectors 10. In such a manner, the partial images 44 projected by the respective projectors 10 are joined together by the screen 20 that displays them in the proper orientations, thereby displaying the viewpoint images 40. As a result, the user can perceive the display target three-dimensionally via the viewpoint images 40.

[Diffraction of Image Light by Screen]

Figure 5:
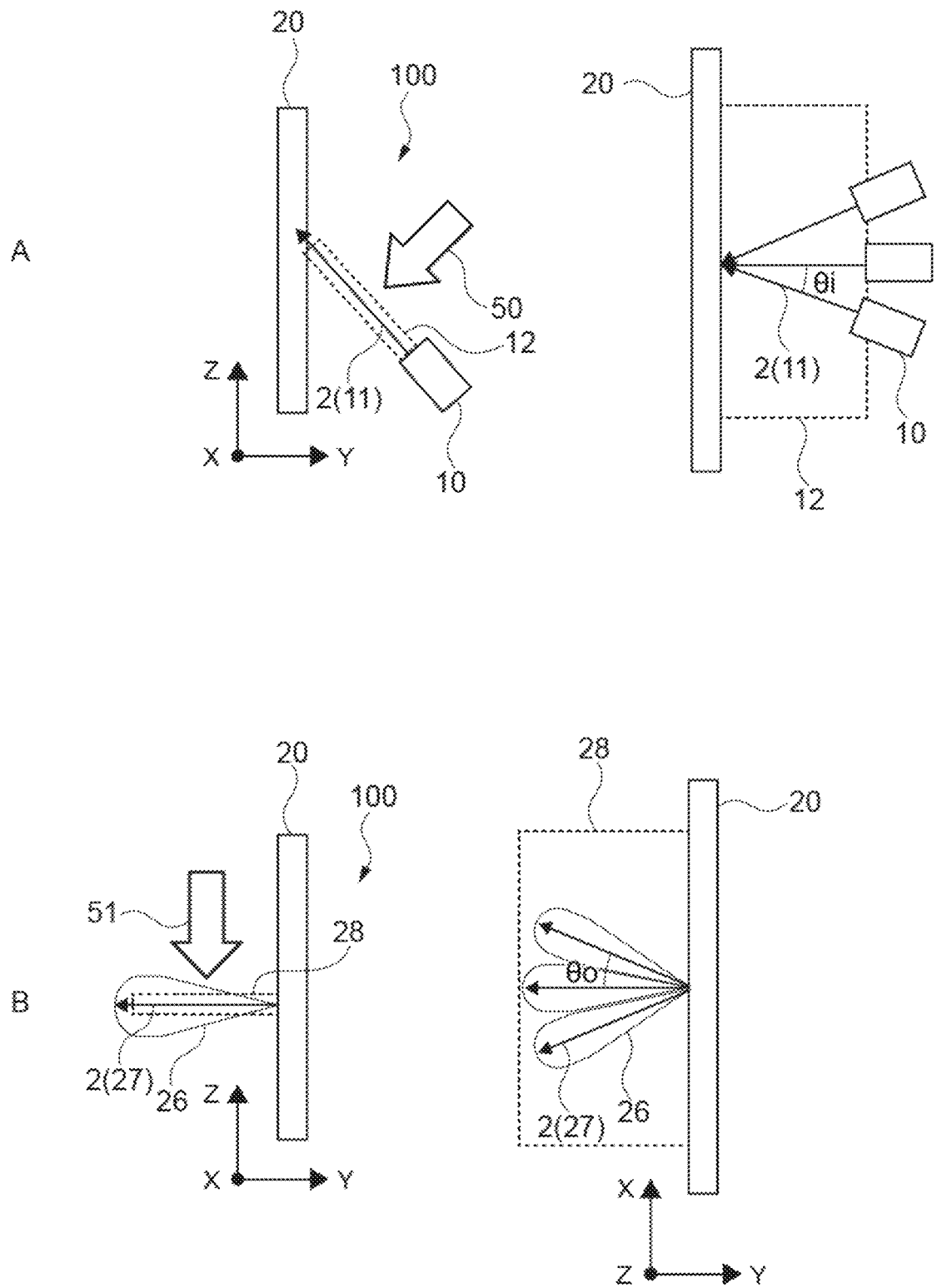
FIG. 5 shows schematic diagrams for describing an incident angle and an output angle of image light with respect to the screen.
Figure 6:
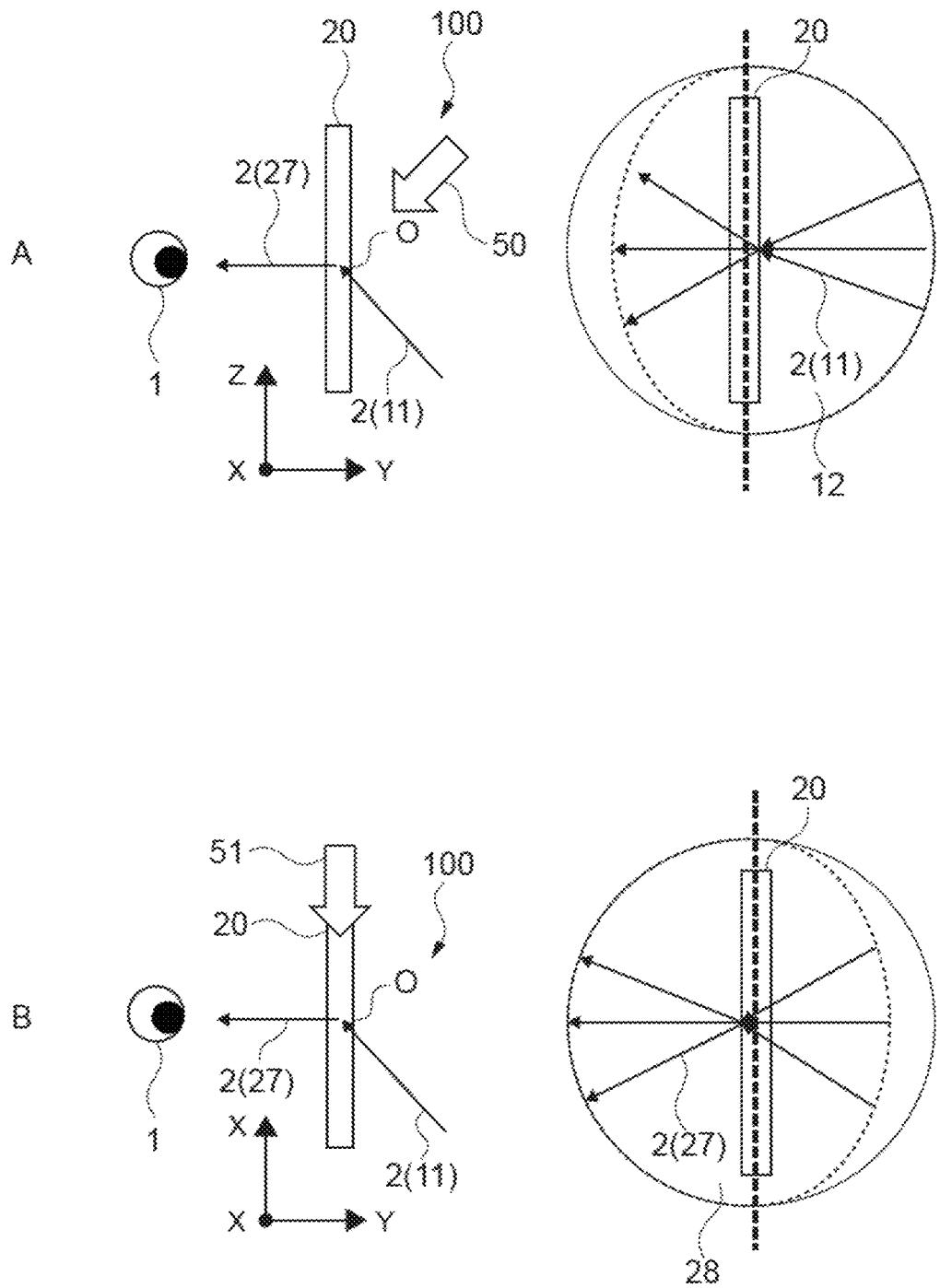
FIG. 6 shows schematic diagrams of an exemplary optical path of the image light diffracted by the screen.

FIG. 5 shows schematic diagrams for describing the incident angle and the output angle of the image light 2 with respect to the screen 20. FIG. 6 shows schematic diagrams showing examples of an optical path of the image light 2 diffracted by the screen 20. Referring now to FIGS. 5 and 6, a description will be given of the change in the azimuth angle of the optical path of the image light 2 mainly diffracted by the screen 20.

A of FIG. 5 schematically shows the optical path of the image light 2 incident on the screen 20 along the projection axis 11. The left-side view of A of FIG. 5 is a side view of the image display apparatus 100 as viewed along the X direction, schematically showing the projection reference plane 12, on which the projection axes 11 are arranged, by the region of the dotted lines. In practice, the projection reference plane 12 is a plane without thickness. Further, the right-side view of A of FIG. 5 is a view of the image display apparatus 100 as viewed from a first direction 50 (the direction of the arrow in the left-side view of A of FIG. 5) perpendicular to the projection reference plane 12. As shown on the right side of A of FIG. 5, in the image display apparatus 100, the projectors 10 are disposed such that the respective projection axes 11 are directed to any one point (reference point O) set on the screen 20. At that time, the angular interval between the projection axes 11 on the projection reference plane 12 is defined as an incident angular interval $\theta_i$.

In B of FIG. 5, the image light 2 diffused and output from the screen 20 is schematically shown as a light distribution 26 (intensity distribution). Further, in the light distribution 26, a peak direction 27 in which the intensity of the image light 2 is a peak is indicated by an arrow. In the following, a plane including the peak direction 27 in the light distribution 26 will be described as an output reference plane 28. The output reference plane 28 is a plane intersecting with the screen 20 at the output elevation angle $\varphi_o$. In this embodiment, the output reference plane 28 corresponds to a second plane.

The left-side view of B of FIG. 5 is a side view of the image display apparatus 100 as viewed along the X direction, schematically showing the output reference plane 28, on which the peak direction 27 is arranged, by the region of the dotted lines. In practice, the output reference plane 28 is a plane without thickness. Further, the right-side view of B of FIG. 5 is a view of the image display apparatus 100 as viewed from a second direction 51 (the direction of the arrow in the figure on the left side of B of FIG. 5) perpendicular to the output reference plane 28. In this embodiment, the second direction 51 is a vertical direction. As shown on the right side of B of FIG. 5, the image light 2 incident on the reference point O along the projection axis 11 of each projector 10 is diffused by the screen 20, showing the light distribution 26 each having a different peak direction 27. At that time, the angular interval of the peak directions 27 on the output reference plane 28 is defined as an output angular interval $\theta_o$.

As described above, the projection reference plane 12 including the projection axes 11 and the output reference plane 28 including the peak directions 27 are planes intersecting with the screen 20 at different elevation angles (incident elevation angle $\varphi_i$ and output elevation angle $\varphi_o$). Note that the incident angular interval $\theta_i$ defined by the projection reference plane 12 is an angle equal to the output angular interval $\theta_o$ defined by the output reference plane 28 ($\theta_i=\theta_o$).

In A of FIG. 6 and B of FIG. 6, the optical path of the image light 2 that is incident on the screen 20 (reference point O) along the projection axis 11 and is output along the peak direction 27 is schematically shown. In A of FIG. 6 and B of FIG. 6, the left-side view is a side view showing the optical path of the image light 2, and the right-side view is a view of the optical path of the image light 2 as viewed from the first direction 50 and the second direction 51.

As shown in A of FIG. 6, when viewed from the first direction 50 perpendicular to the projection reference plane 12, the output reference plane 28 appears inclined with respect to the projection reference plane 12. Therefore, in the projection reference plane 12, the angular interval of the peak directions 27 of the image light 2 output from the screen 20 is an angle different from the incident angular interval $\theta_i$.

As shown in B of FIG. 6 as well, when viewed from the second direction 51 perpendicular to the output reference plane 28, the projection reference plane 12 appears inclined with respect to the output reference plane 28. Thus, in the output reference plane 28, the angular interval of the projection axes 11 of the projectors 10 is an angle different from the output angular interval $\theta_o$. Further, as described above, the second direction 51 is the vertical direction. Therefore, the left-side view of B of FIG. 6 is a view showing the azimuth angle of the projection axis 11 and the peak direction 27 with respect to the screen 20. Thus, in the image display apparatus 100, since the elevation angle of the optical path of the image light 2 is changed by the screen 20, the azimuth angle of the optical path of the image light 2 with respect to the screen 20 also changes.

Specifically, the angular interval of the peak directions 27 with respect to the screen 20 (output angular interval $\theta_o$) is narrower than the angular interval of the projection axes 11 with respect to the screen 20, i.e., the angular interval obtained when the projection axes 11 arranged at the incident angular interval $\theta_i$ on the projection reference plane 12 are projected to the output reference plane 28. In this embodiment, image data suitable for such an angular relationship is generated by the image generation unit 30.

Figure 7:
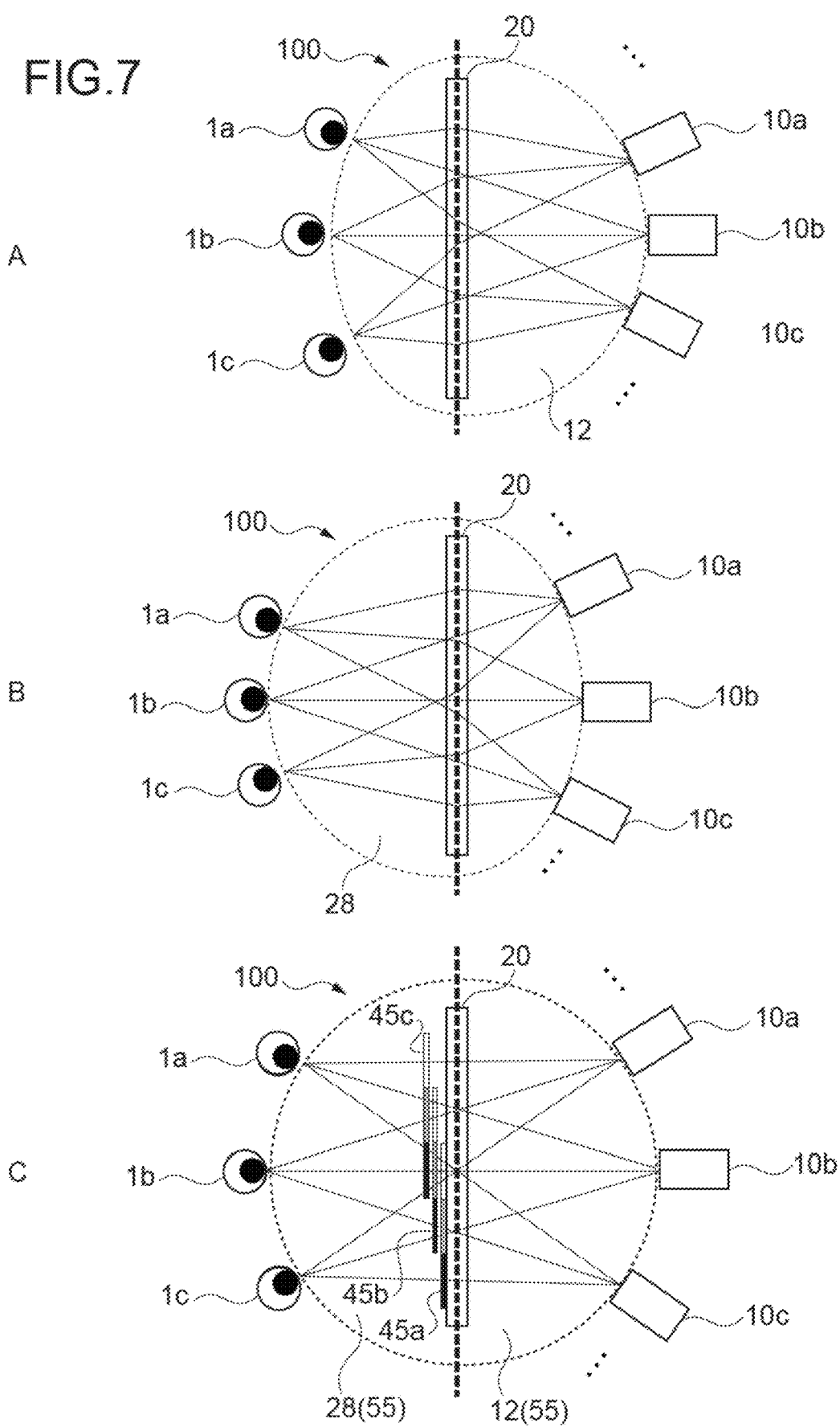
FIG. 7 shows schematic diagrams showing an exemplary optical path of the image light for displaying the viewpoint image.

FIG. 7 shows schematic diagrams of exemplary optical paths of the image light 2 for displaying the viewpoint image 40. In FIG. 7, three projectors 10a to 10c are disposed in order from the top in the figure, and three viewpoints 1a to 1c (virtual viewpoints) are set in order from the top in the figure. Note that the central projector 10b and the central viewpoint 1b are disposed so as to face the screen 20 directly. For those viewpoints 1a to 1c, the viewpoint images 40 different from each other (see FIG. 9) are respectively displayed.

A of FIG. 7 and B of FIG. 7 are views of the optical paths of the image light 2 projected by the projectors 10a to 10c as viewed from the first direction 50 and the second direction 51, showing spatial arrangement relationships between the projectors 10 and the respective viewpoints 1. As shown in A of FIG. 7, the projectors 10 are disposed in an arc shape on the projection reference plane 12 as viewed from the first direction 50. Meanwhile, the viewpoints 1 are disposed along the arc distorted by being projected onto the projection reference plane 12. Further, as shown in B of FIG. 7, the viewpoints 1 are disposed in an arc shape on the output reference plane 28 as viewed from the second direction 51. Meanwhile, the projectors 10 are disposed along the arc distorted by being projected onto the output reference plane 28. Thus, the azimuth angle of the optical path of the image light 2 for displaying the viewpoint image 40 with respect to the screen 20 changes at the screen 20.

C of FIG. 7 is a diagram showing the optical path of the image light 2 when the projection reference plane 12 and the output reference plane 28 are viewed as the same plane (virtual reference plane 55). In other words, the virtual reference plane 55 can be said to be a plane obtained by bending one of the projection reference plane 12 and the output reference plane 28 and connecting the reference planes in parallel. In the virtual reference plane 55, the projectors 10a to 10c and the viewpoints 1a to 1c are disposed along the same circumference. Further, the azimuth angle of the optical path of the image light 2 with respect to the screen 20 does not change at the screen 20, and each optical path can be regarded as a straight optical path that is transmitted through the screen 20.

Therefore, the direction in which the image light 2 is projected from each projector 10 on the projection reference plane 12 is a direction in which the image light 2 is output from the screen 20 on the output reference plane 28. In other words, by using the projection direction of the image light 2 on the projection reference plane 12 rather than using the azimuth angle with respect to the screen 20, it is possible to properly calculate the direction in which each image light 2 is actually output. Thus, in the image generation unit 30, the image data for displaying the viewpoint image 40 is generated on the basis of the direction of the projection axis 11 as the reference of the projection direction of the image light 2 on the projection reference plane 12.

[Generation of Image Data]

In this embodiment, the image generation unit 30 generates a plurality of viewpoint images 40 corresponding to the viewpoints 1 assumed from the directions of the projection axes 11 on the projection reference plane 12, and generates image data 41 on the basis of the plurality of viewpoint images 40 generated. For example, on the virtual reference plane 55 described above, the intersection of the projection axis 11 and the circumference on which each projector 10 is disposed is set as the viewpoint 1 assumed from the direction of the projection axis 11 on the projection reference plane 12. The image generation unit 30 generates a viewpoint image 40 to be displayed at the viewpoint 1. For example, the viewpoint image 40 corresponding to the direction, position, or the like of the viewpoint 1 on the projection reference plane 12 is generated as appropriate. In addition, image data that is data to be input to each projector 10 is generated using the viewpoint image 40.

In this embodiment, each of the plurality of viewpoint images 40 is divided into the partial images 44, and a plurality of composite images 45, in each of which the partial images 44 corresponding to each of the plurality of projectors 10 are combined, is generated as image data 41. As described with reference to FIG. 4, the partial image 44 is, for example, a strip-shaped image obtained by dividing the viewpoint image 40 in the longitudinal direction. The width of the partial image 44 is set, for example, in accordance with the incident angular interval $\theta_i$ of the projection axis 11 or the output angular interval $\theta_o$ of the peak direction 27. Further, for example, it may be appropriately set in accordance with the horizontal diffusion angle β of the screen 20, the width of the image that can be displayed by the projector 10, the number of projectors 10 mounted on the image display apparatus 100, or the like. Further, the composite image 45 is generated by assigning corresponding partial images 44 to the divided regions 43 provided for each projector 10. The method of assigning the partial image 44 is the same as the method described with reference to FIG. 4.

Figure 8:
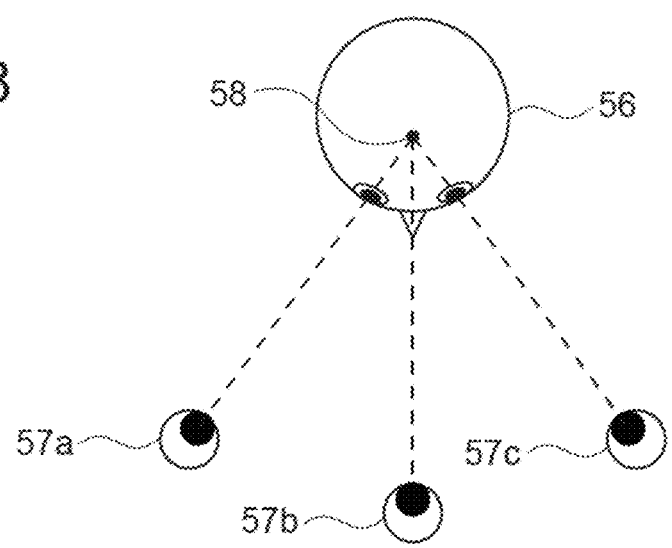
FIG. 8 is a schematic diagram for describing the viewpoint image.
Figure 9:
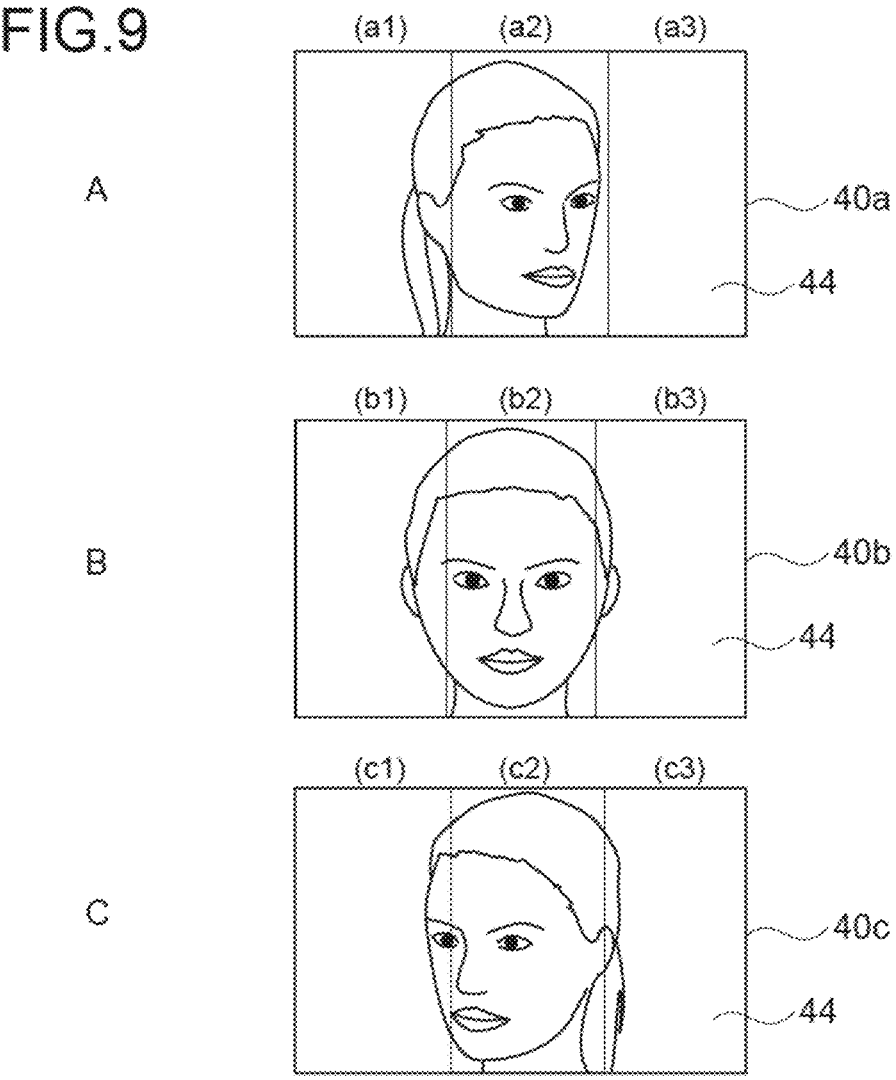
FIG. 9 shows schematic diagrams of exemplary viewpoint images.

FIG. 8 is a schematic diagram for describing the viewpoint image 40. FIG. 9 shows schematic diagrams of exemplary viewpoint images 40. In FIGS. 8 and 9, as an example of the viewpoint image 40, an image in which a display target 56 is viewed from various directions will be described. FIG. 8 schematically shows the head of a person as viewed from the top of the head as the display target 56 displayed as the viewpoint image 40. It is assumed that the display target 56 is observed from observation points 57*a* to 57*c*. The observation point 57*a* is a point at which a person as the display target 56 is observed from the left front, the observation point 57*b* is a point at which the person is observed from the front, and the observation point 57*c* is a point at which the person is observed from the right front.

Further, each of the observation points 57*a* to 57*c* is set on a circumference centered on a reference axis 58. In other words, the observation points 57*a* to 57*c* are points at which the display target 56 is observed from different orientations centered on the reference axis 58. Images viewed (or captured) from those observation points 57 are generated as the plurality of viewpoint images 40. In other words, it can be said that the plurality of viewpoint images 40 is images in which the display target 56 is viewed from different observation orientations centered on the reference axis 58. The method of generating the viewpoint image 40 is not limited. For example, images obtained by imaging a real display target 56, a three-dimensional computer graphics, or the like from different orientations may be used as the viewpoint images 40. Images in which the display target 56 is viewed from the respective observation points 57*a* to 57*c* are generated as the viewpoint images 40 shown in A of FIG. 9 to C of FIG. 9, respectively.

In this embodiment, the image generation unit 30 sets the observation orientations of the plurality of viewpoint images 40 on the basis of the directions of the projection axes 11 on the projection reference plane 12. As described above, it is possible to calculate the direction of the viewpoint 1 in which the viewpoint image 40 is displayed from the direction of the projection axis 11 on the projection reference plane 12. Thus, it is possible to easily generate the viewpoint image 40 or the like for which the observation orientation is set at an angle suitable for each viewpoint 1.

Specifically, the image generation unit 30 sets the angular interval of the projection axes 11 on the projection reference plane 12 (incident angular interval $\theta_i$) as the angular interval of the observation orientations of the plurality of viewpoint images 40. The incident angular interval $\theta_i$ is equal to the output angular interval $\theta_o$ of the peak direction 27. Therefore, setting the incident angular interval $\theta_i$ to the angular interval of the observation orientations is equal to setting the output angular interval $\theta_o$ to the angular interval of the observation orientations. As a result, for example, the angle at which the viewpoint image 40 displayed on the screen 20 is switched can be matched with the angle at which the observation orientation of the display target 56 displayed by the viewpoint image 40 is switched.

Further, the image generation unit 30 sets the reference axis 58 so as to be perpendicular to the output reference plane 28 intersecting with the screen 20 at the output elevation angle $\varphi_o$. Thus, for example, it is possible to match the rotation axis (reference axis 58) of the observation point 57, which is used when the viewpoint image 40 is generated, and the rotation axis when the viewpoint 1 is moved in the actual space, and it is possible to perform display by switching the observation direction without shifting the position of the display target 56 when the viewpoint 1 of the user is moved. As a result, it is possible to achieve stereoscopic display with a high sense of reality as if the display target 56 exists in the real space.

The viewpoint images 40*a* to 40*c* of the display target 56 are each divided into partial images 44. In the example shown in FIG. 9, each of the viewpoint images 40*a* to 40*c* is divided into three partial images 44. Hereinafter, the three partial images 44 obtained by dividing the viewpoint image 40*a* will be referred to as a partial image (a1), a partial image (a2), and a partial image (a3) in order from the left. Similarly, the viewpoint image 40*b* is divided into partial images (b1) to (b3), and the viewpoint image 40*c* is divided into partial images (c1) to (c3).

Figure 10:
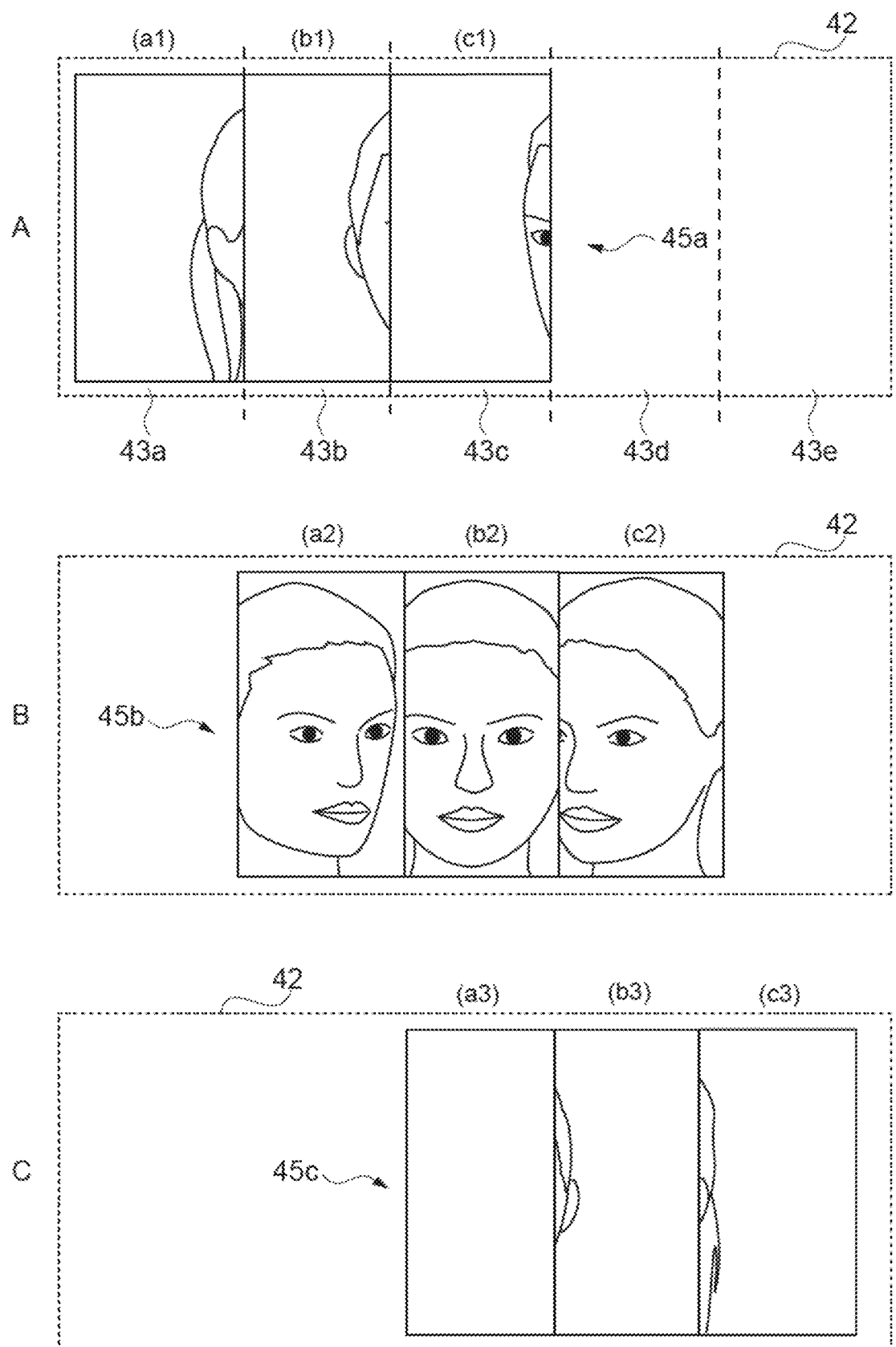
FIG. 10 shows schematic diagrams of exemplary image data for displaying the viewpoint images shown in the figure.

FIG. 10 shows schematic diagrams of exemplary image data 41 for displaying the viewpoint images 40 shown in FIG. 9. In A to C of FIG. 10, composite images 45*a* to 45*c* input to the projectors 10*a* to 10*c* shown in FIG. 7 are schematically shown as the image data 41, respectively. Further, the frame of the dotted line in the figure is the display region 42 of each projector 10. The display region 42 is divided into five divided regions 43*a* to 43*e* in order from the left in the figure. The partial image 44 shown in FIG. 9 is assigned to each of those divided regions 43.

For example, in the projector 10*a*, the partial image (a1), the partial image (b1), and the partial image (c1) are assigned to the divided regions 43*a*, 43*b*, and 43*c*, respectively. Further, in the projector 10*b*, the partial image (a2), the partial image (b2), and the partial image (c2) are assigned to the divided regions 43*b*, 43*c*, and 43*d*, respectively. Further, in the projector 10*b*, the partial image (a3), the partial image (b3), and the partial image (c3) are assigned to the divided regions 43*c*, 43*d*, and 43*e*, respectively. As described above, the images input to one projector 10 become a composite image 45 in which the longitudinal strip-shaped partial images 44 corresponding to the plurality of viewpoints 1 are assigned.

In FIG. 7, the composite images 45*a* to 45*c*, which are projected by the projectors 10*a* to 10*c* and displayed on the screen 20, are schematically shown by shifting the positions in the Y direction. Actually, those composite images 45 are images displayed on the same surface of the screen 20. In the viewpoint images 40, the left partial image 44 (a1, b1, c1) is shown as a black region, the center partial image 44 (a2, b2, c2) is shown as a gray region, and the right partial image 44 (a3, b3, c3) is shown as a white region. As a result, in each of the viewpoints 1*a* to 1*c*, only the partial images 44 at the angles seen from the respective viewpoints 1 are connected and observed as the viewpoint images 40*a* to 40*c*. As a result, the user can observe a stereoscopic image, which is displayed on the transparent screen 20 and superimposed on the background, with high resolution.

Figure 11:
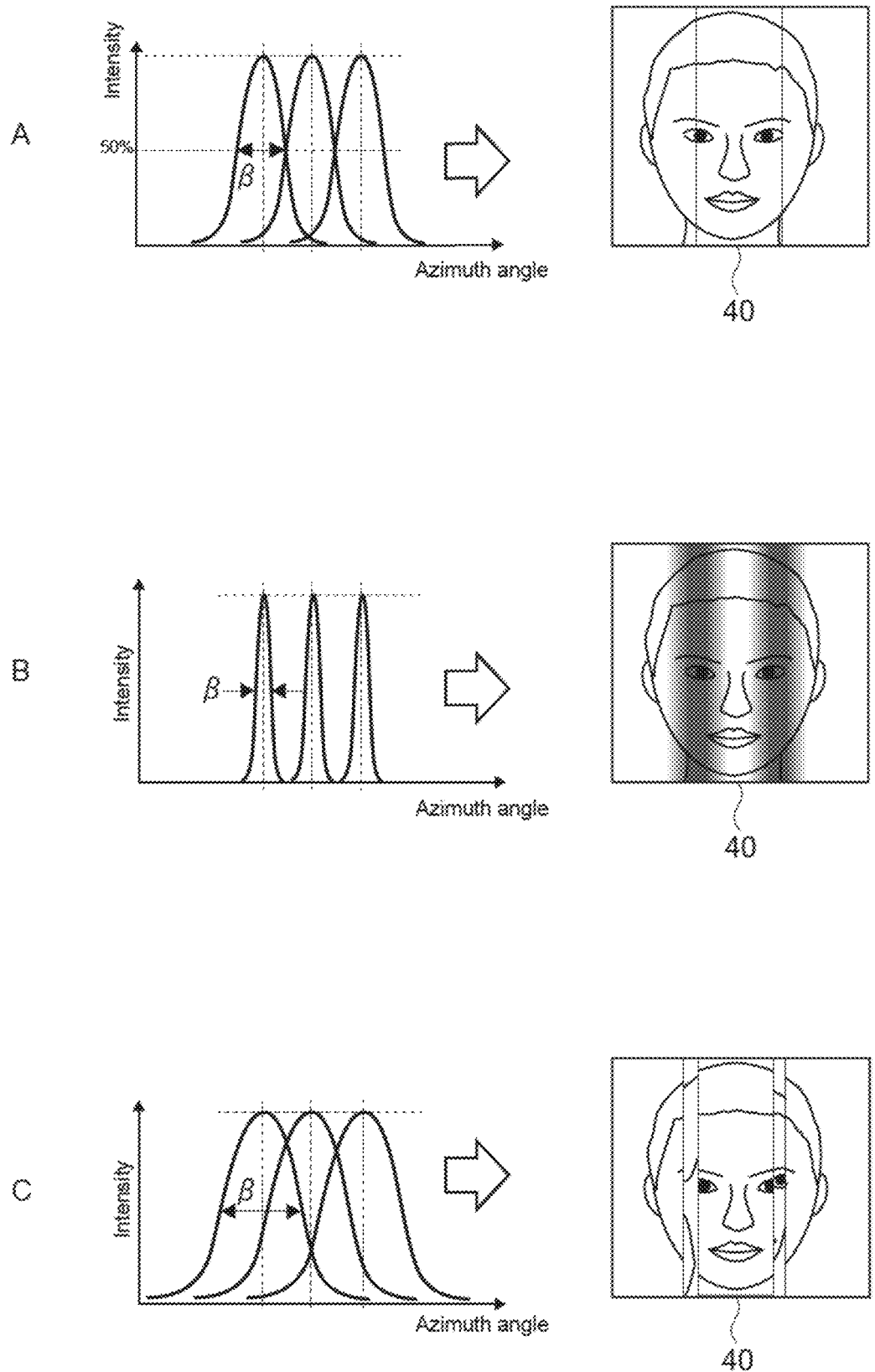
FIG. 11 shows schematic diagrams for describing the relationship between the viewpoint image and a horizontal diffusion angle.

FIG. 11 shows schematic diagrams for describing the relationship between the viewpoint image 40 and the horizontal diffusion angle $\beta$. For example, as shown on the left side of A of FIG. 11, the intensity of the image light 2 to be diffused horizontally is peaked at an angular interval of the projection axes 11. At that time, at an angle in the middle of the intensity peak, the diffraction efficiency is reduced and the luminance is reduced, and there is a possibility that luminance unevenness occurs in the viewpoint image 40. Such luminance unevenness can be avoided by widening the horizontal diffusion angle $\beta$. Meanwhile, if the horizontal diffusion angle $\beta$ is too wide, a crosstalk is noticeable, in which images displayed toward the adjacent viewpoints 1 are mixed and displayed.

B of FIG. 11 schematically shows an example of the case where the horizontal diffusion angle β is narrow and the luminance unevenness occurs in the viewpoint image 40. It is possible to avoid a crosstalk by setting the horizontal diffusion angle β narrow, but a region where the luminance is reduced occurs between the intensity peaks. Thus, the luminance between the adjacent partial images 44 is reduced, and there is a possibility that the luminance unevenness like longitudinal stripes occurs on the entire viewpoint image 40. Further, C of FIG. 11 schematically shows an example in which a crosstalk is noticeable due to the wide horizontal diffusion angle β. In this case, the image light intensity between the intensity peaks is high, and images to be displayed in other orientations are visible. Therefore, the resolution of the viewpoint image 40 may be lowered.

Therefore, in this embodiment, as shown in A of FIG. 11, the horizontal diffusion angle β is set to minimize a crosstalk within the range in which the luminance unevenness of the viewpoint image 40 is allowed. This makes it possible to, as shown in the right side of A of FIG. 11, perform high-resolution image display in which the luminance unevenness is suppressed and the crosstalk is small. Note that the method of setting the horizontal diffusion angle β is not limited. Appropriately adjusting the horizontal diffusion angle β makes it possible to suppress the luminance unevenness preferentially and to suppress the crosstalk preferentially.

Figure 12:
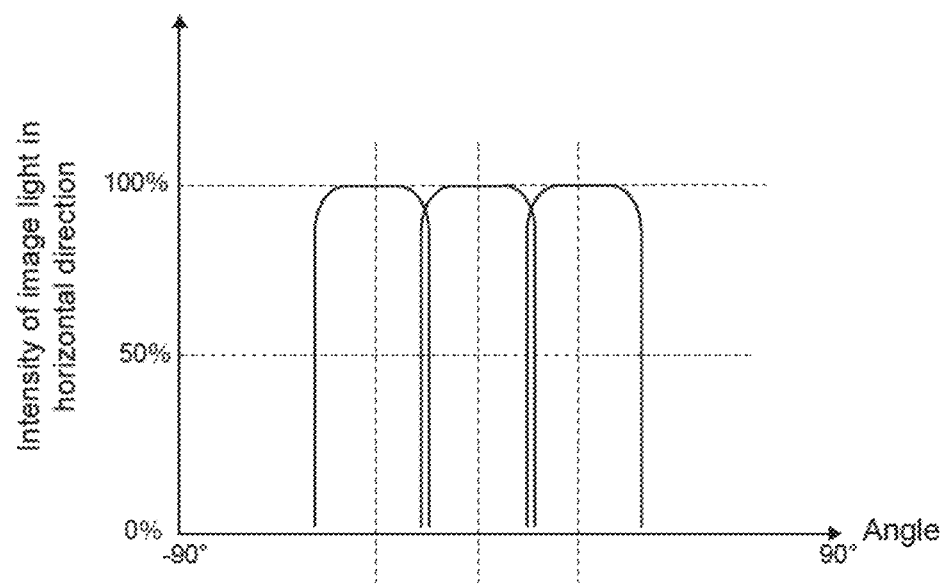
FIG. 12 is a schematic graph showing exemplary horizontal diffusion characteristics of the transmissive hologram.

FIG. 12 is a schematic graph showing an example of the diffusion characteristics in the horizontal direction of the transmissive hologram 22. In FIG. 12, the transmissive hologram 22 (screen 20) is configured such that the diffusion distribution of the image light 2 along the horizontal plane is a distribution of the top hat shape. The distribution of the top hat shape has a broad intensity peak, while the intensity of the image light 2 decreases rapidly when it exceeds the horizontal diffusion angle β. Thus, the image light 2 is diffused in the diffusion distribution of the top hat shape close to a rectangle, so that it is possible to perform high-resolution image display in which the images for the adjacent viewpoints 1 are not mixed and a crosstalk is suppressed.

Note that when the top hat shape distribution is adopted, it is considered that the shoulder portion of the intensity peak actually becomes moderate to some extent. Therefore, the horizontal diffusion angle β is set such that the peak structures for each angular interval of the projection axes 11 overlap somewhat. Thus, it is possible to smoothly connect each viewpoint image as well as uniformizing the luminance of the viewpoint image 40.

For example, the HOE used as the transmissive hologram 22 is capable of recording the light of an object. For example, using this characteristics to record the Gaussian distribution of the diffusion plate or using a device capable of performing spatial intensity modulation on the Fourier plane of the 4f optical system to create an HOE makes it possible to configure a transmissive hologram 22 or the like having diffusion characteristics of the top hat shape. Note that a spatial light modulator (SLM), an apodizing filter, or the like can be used as the device for performing spatial intensity modulation.

Figure 13:
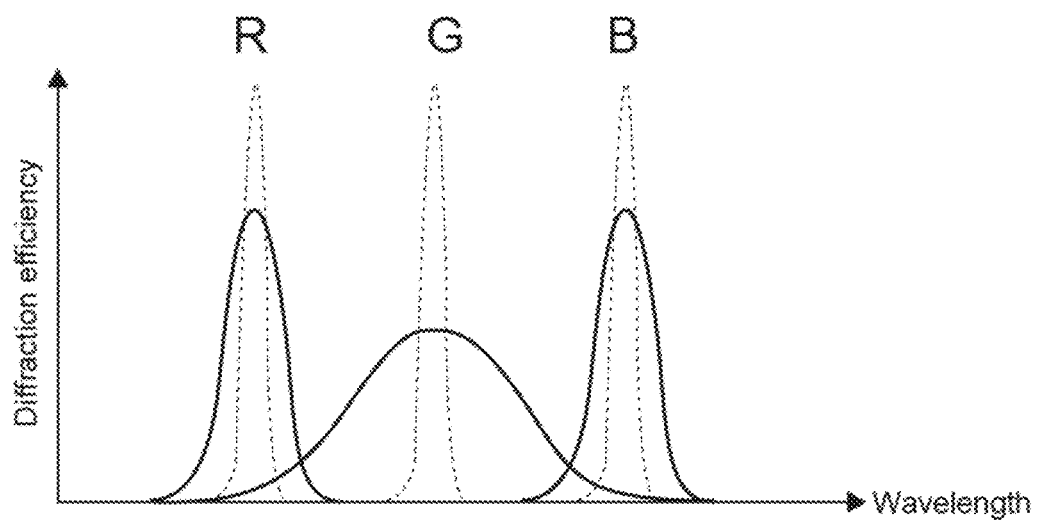
FIG. 13 is a schematic graph showing exemplary wavelength characteristics of a light source of the projector.

FIG. 13 is a schematic graph showing an example of the wavelength characteristics of the light source of the projector 10. Here, a case will be described in which the projector 10 using an LED light source is used instead of the projector 10 using a laser light source. In FIG. 13, the diffraction efficiency in the HOE for each color light of RGB output from the LED light source is shown as a graph of a solid line. The vertical axis of the graph is the diffraction efficiency in the HOE, and the horizontal axis is the wavelength of each color light.

The color light output from the LED light source has a wider wavelength width than the color light output from the laser light source, for example. Thus, if the wavelength width of the color light of the LED light source is wide for the wavelength selectivity of the HOE, the diffraction efficiency may be lowered. Therefore, if the projector 10 having an LED light source is used, it is preferable that a wavelength selection filter or the like for narrowing the wavelength width of the color light of the LED light source is used together.

In FIG. 13, the diffraction efficiency in the HOE for each color light of RGB output through the wavelength selection filter is shown as a graph of a dotted line. For example, the wavelength width is narrowed by passing each color light of RGB through a wavelength selection filter that matches each wavelength. Thus, it is possible to input the color light of the wavelength width that matches the wavelength selectivity of the HOE, and to significantly improve the diffraction efficiency.

Figure 14:
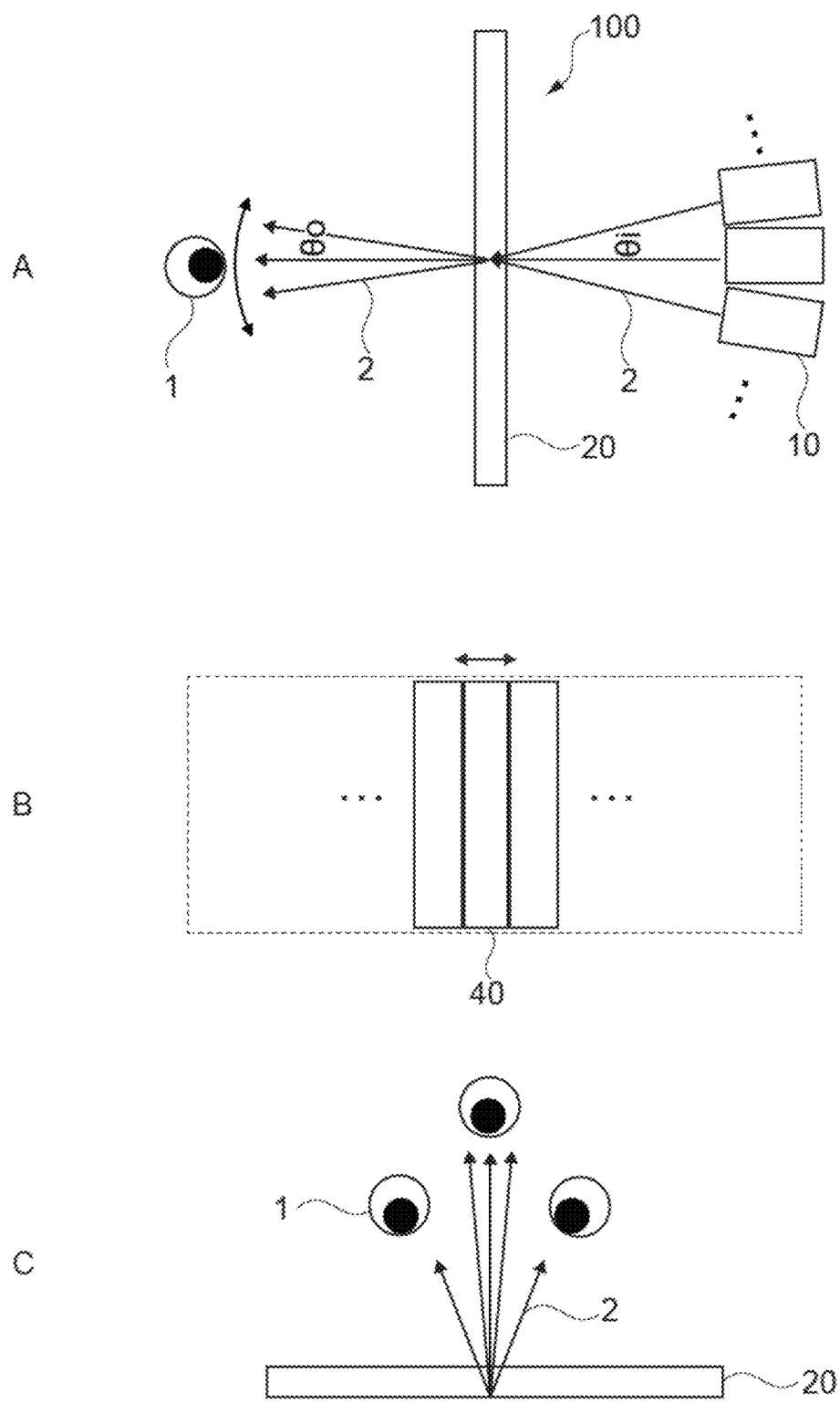
FIG. 14 shows schematic diagrams of a display example when a narrow angular interval of projection axes is set.

FIG. 14 shows schematic diagrams of a display example when the angular interval of the projection axes 11 is set narrow. A of FIG. 14 is a top view of the image display apparatus as viewed from the Z direction, and B of FIG. 14 is a front view of the screen as viewed from the Y direction. Further, C of FIG. 14 is a schematic diagram showing an example of the image light 2 output to the viewpoint 1 at which the screen 20 is observed. In FIG. 14, the angular interval of the projection axes 11 (incident angular interval $θ_j$) is set to an angle smaller than the angle at which the binocular disparity of the human eyes occurs, for example. Note that the present technology is not limited to the above, and an angular interval at around an angle at which the binocular disparity occurs (e.g., ±10 degrees) may be set.

As shown in A of FIG. 14, if the angular interval of the projection axes 11 is set narrow, the horizontal diffusion angle β in the transmissive hologram 22 is set to a narrow angle in the range in which the viewpoint image 40 is properly displayed. Further, as shown in B of FIG. 14, the display width per one angle (projection axis 11) is narrowed. In the image display apparatus 100 thus configured, the angular resolution is improved, and each viewpoint image 40 can be finely switched for display, thus achieving a smooth stereoscopic view. For example, if the angular interval of the projection axes 11 is an angle smaller than the angle of the binocular disparity, it is also possible to stereoscopically display the display target 56 without moving the viewpoint 1.

Further, in this configuration, increasing the number of projectors 10 makes it possible to easily display a smooth stereoscopic image in a wide angular range. On the other hand, reducing the number of projectors 10 makes it possible to selectively display the viewpoint image 40 only in a limited angular range. In addition, since the number of projectors 10 is reduced, it is possible to suppress the cost of the apparatus. Note that, since the display width is narrowed, the projectors 10 necessary only for the size of an image to be displayed are required. For example, as shown in C of FIG. 14, the viewpoint image 40 projected to a narrower angular range is observed only at a particular viewpoint 1, and the image is hardly observed at other viewpoints 1.

This makes it possible to provide a presentation method in which a stereoscopic image can be seen in a specific angular range, but it cannot be seen suddenly when the viewpoint 1 is shifted. In other words, it is possible to present an image or information only to a person who is desired to see it or in a direction that is desired to see. Application examples of such display methods include suddenly displaying a 3D ghost in a haunted house or the like, displaying clothes worn by mannequins only when a show window is viewed from the front, displaying 3D images when audience see them from the front in live halls, stages, and the like, and presenting information such as how to open the door or a destination to passengers standing in front when getting in and out of trains. Further, assuming a situation in which the viewpoint 1 is fixed, such an application that an image is displayed so as not to be seen by a neighboring person in a driver's seat, a bedroom, a design work, or the like can also be made possible.

Figure 15:
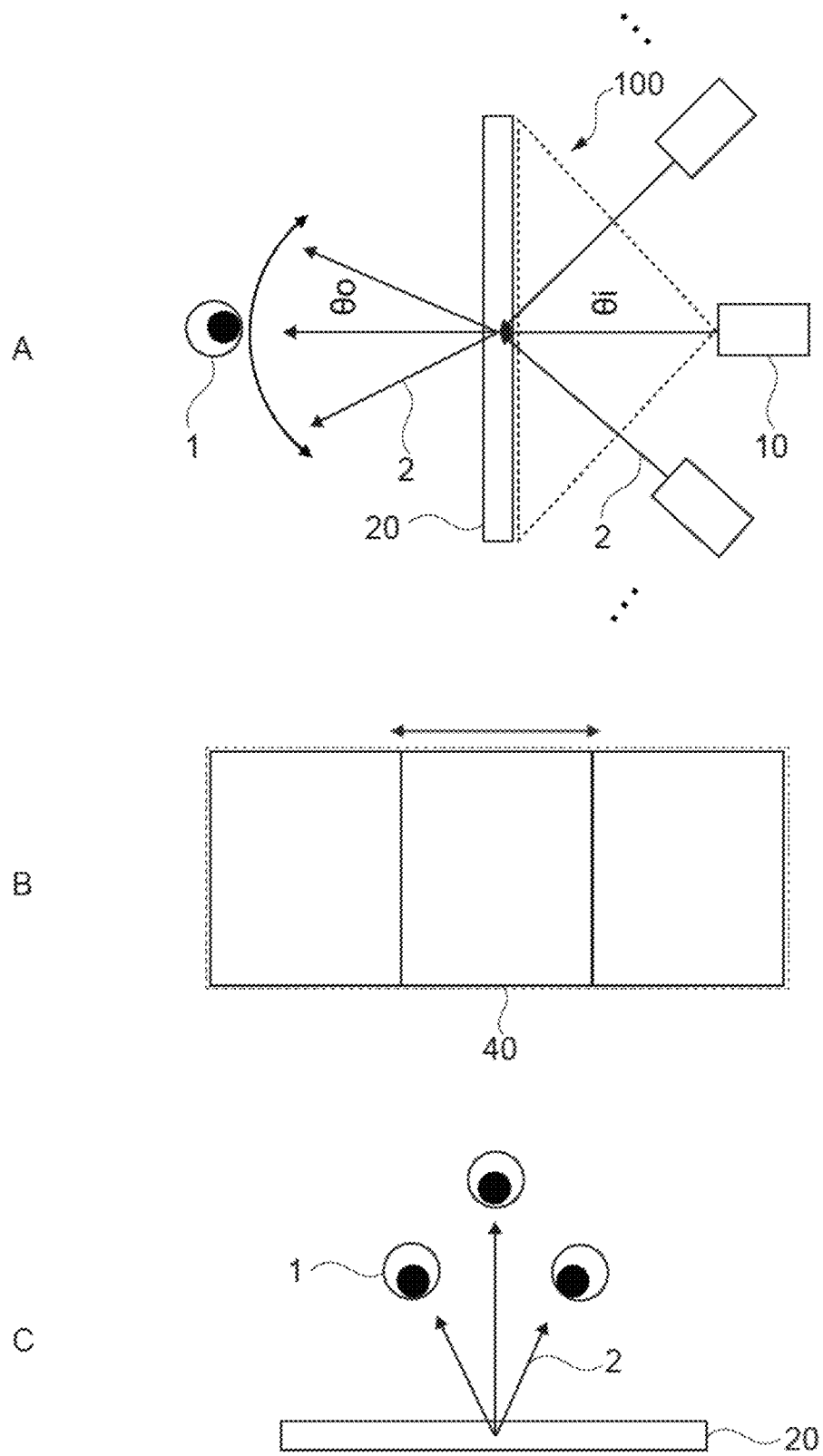
FIG. 15 shows schematic diagrams of a display example when a wide angular interval of the projection axes is set.

FIG. 15 shows schematic diagrams of a display example in the case of setting a wide angular interval of the projection axes 11. A of FIG. 15 is a top view of the image display apparatus as viewed from the Z direction, and B of FIG. 15 is a front view of the screen as viewed from the Y direction. Further, C of FIG. 15 is a schematic diagram showing an example of the image light 2 output from the viewpoint 1 at which the screen 20 is observed. In FIG. 15, the angular interval of the projection axes 11 (incident angular interval $\theta_i$) is set to an angle larger than the angle at which the binocular disparity of the human eyes occurs, for example. Alternatively, the angular interval may be set in accordance with an angle or the like at which the viewpoint 1 changes when the user changes the standing position and moves.

As shown in A of FIG. 15, if the angular interval of the projection axes 11 is set wide, the horizontal diffusion angle $\beta$ in the transmissive hologram 22 is set to a wide angle in accordance with the angular interval of the projection axes 11. Further, as shown in B of FIG. 15, the display width per one angle (projection axis 11) is widened. This configuration allows a small number of projectors 10 to display the viewpoint image 40 over a wide angular range. In addition, since the angle at which the images are switched is large, for example, an application example in which information or the like displayable in a two-dimensional image is displayed at different viewpoints 1 is conceivable. For example, it is possible to configure the image display apparatus 100 as an in-vehicle device to display the signages of a map, a guidance, and the like on the driver's seat, a passenger seat, and a rear seat.

Hereinabove, in the image display apparatus 100 according to this embodiment, the plurality of projectors 10 is disposed with the projection axes 11 facing in different directions along the projection reference plane 12. Further, the screen 20 is provided, which intersects with the projection reference plane 12 at the incident elevation angle $\varphi_i$. The image light 2 projected from each projector 10 along the projection reference plane 12 is diffused and output at the output elevation angle $\varphi_o$ different from the incident elevation angle $\varphi_i$. This increases the degree of freedom in the arrangement of the projectors 10 and the screen 20, for example. Further, the image data 41 of the image light 2 is data for displaying the viewpoint image 40 corresponding to the viewpoint 1 at which the screen 20 is observed at the output elevation angle $\varphi_o$, and is generated on the basis of the directions of the projection axes 11 on the projection reference plane 12. Thus, for example, the direction in which the viewpoint image 40 is displayed can be accurately calculated. As a result, it is possible to appropriately display an image corresponding to the viewpoint 1 of the user and to reduce the size of the apparatus.

Figure 16:
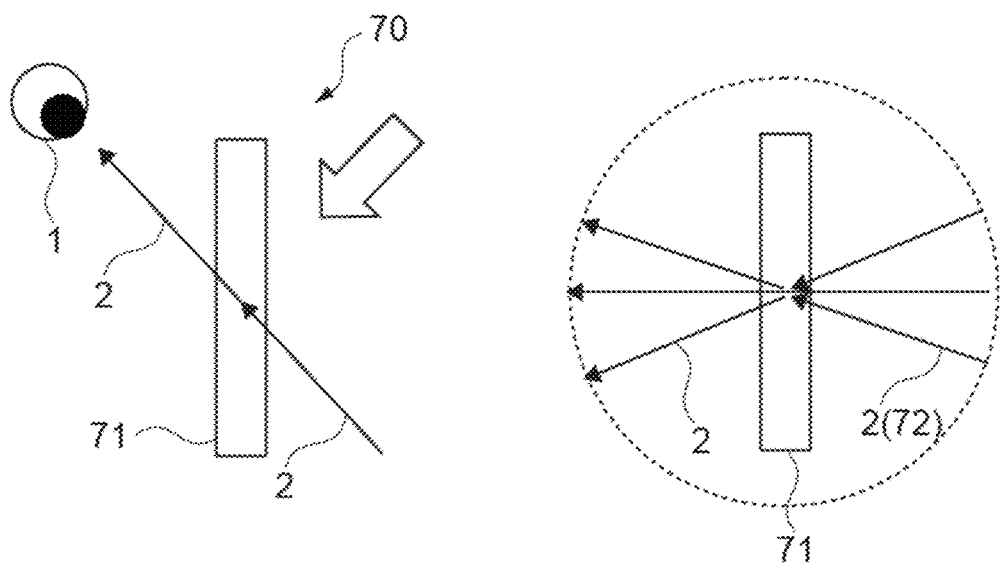
FIG. 16 is a schematic diagram showing a configuration example of an image display apparatus as a comparative example.

FIG. 16 is a schematic diagram showing a configuration example of an image display apparatus 70 as a comparative example. In FIG. 16, the image light 2 projected from a projection source (not shown) is transmitted (regular transmission) without changing the optical path thereof and is diffused by a transmissive diffusion screen 71. Therefore, as shown on the left side of FIG. 16, in the diffusion screen 71, the direction of the image light 2 to be diffused (the direction in which the intensity peaks) is the extension direction of the direction in which the image light 2 is projected.

Further, the right side of FIG. 16 shows the optical path of the image light 2 viewed from the direction indicated by the arrow in the figure on the left side. Note that the elevation angle, the azimuth angle, or the like of the optical path of the image light 2 with respect to the diffusion screen 71 when viewed from any direction does not change. In this case, in the processing of generating an image corresponding to the viewpoint, it is possible to use the azimuth angle or the like of a projection axis 72 with respect to the diffusion screen 71 as it is. Meanwhile, in the configuration in which the elevation angle or the azimuth angle of the optical path of the image light 2 changes at the screen, if the azimuth angle or the like of the projection axis 72 with respect to the screen is used as it is, it is difficult to properly display the viewpoint image. Further, in FIG. 16, since the image light 2 passes through the diffusion screen 71 as it is, there is a possibility that the projection source is displayed while overlapping the image. In addition, depending on the arrangement of the projection sources, the size of the apparatus may increase.

Further, for example, there is a method of displaying an image in accordance with a viewpoint by using a diffusion screen or the like in which a diffusion plate is attached to a mirror (see Non-Patent Literature 1). In this case, a stereoscopic image is not superimposed on the background of the real world, and remains in the reality existing within the frame of the diffusion screen. Further, since the screen includes a mirror, the angular relationship between the observation viewpoint and the image source is an arrangement determined under a regular reflection condition, and the degree of freedom of arrangement of the units constituting the apparatus (home factor) is suppressed. There is a possibility that the size of the apparatus is enlarged depending on the configuration.

In this embodiment, the image light 2 incident on the screen 20 at the incident elevation angle $\varphi_i$ along the projection axis 11 is output at the output elevation angle $\varphi_o$. Thus, it is possible to configure the apparatus by separating the direction for projecting the image light 2 and the direction for outputting the image. This makes it possible to design the arrangement relationship between the screen 20 and the projectors 10 without depending on the conditions such as regular transmission or regular reflection, thereby improving the home factor. Thus, for example, it is possible to reduce the size of the apparatus by changing the arrangement position of the projector 10.

Further, the incident elevation angle $\varphi_i$ and the output elevation angle $\varphi_o$ are set to angles different from each other. This makes it possible to avoid a situation in which, for example, the projector 10 is seen by the user observing the viewpoint image 40. As a result, it is possible to provide a high-quality viewing experience.

Further, as the elevation angle of the optical path of the image light 2 changes, the angular interval (output angular interval $\theta_o$) of the image light 2 (peak direction 27), which is output from the screen 20, with respect to the screen 20 becomes narrower with respect to the angular interval of the projection axes 11 with respect to the screen 20. Even in such a case, as described with reference to C of FIG. 7 or the like, the image data 41 is generated on the basis of the direction of the projection axis 11 on the projection reference plane 12, thus making it possible to properly display the viewpoint image 40. Thus, high-precision stereoscopic display or the like is made possible. Further, in order to properly display the viewpoint image 40, the diffusion angle in the horizontal direction (horizontal diffusion angle is set. Thus, it is possible to display a high-resolution viewpoint image 40 without luminance unevenness.

Further, the HOE (transmissive hologram 22) is used as the screen 20. This makes it possible to display the viewpoint image 40 on the transparent screen 20 having high light transmittance. As a result, it is possible to perform display as if the display target 56 exists in the space in front of the user in a state where the display target 56 is superimposed on the background, and it is possible to sufficiently enhance the reality of stereoscopic display.

Second Embodiment

An image display apparatus according to a second embodiment of the present technology will be described. In the following description, descriptions of configurations and effects similar to those in the image display apparatus 100 described in the above embodiment will be omitted or simplified.

Figure 17:
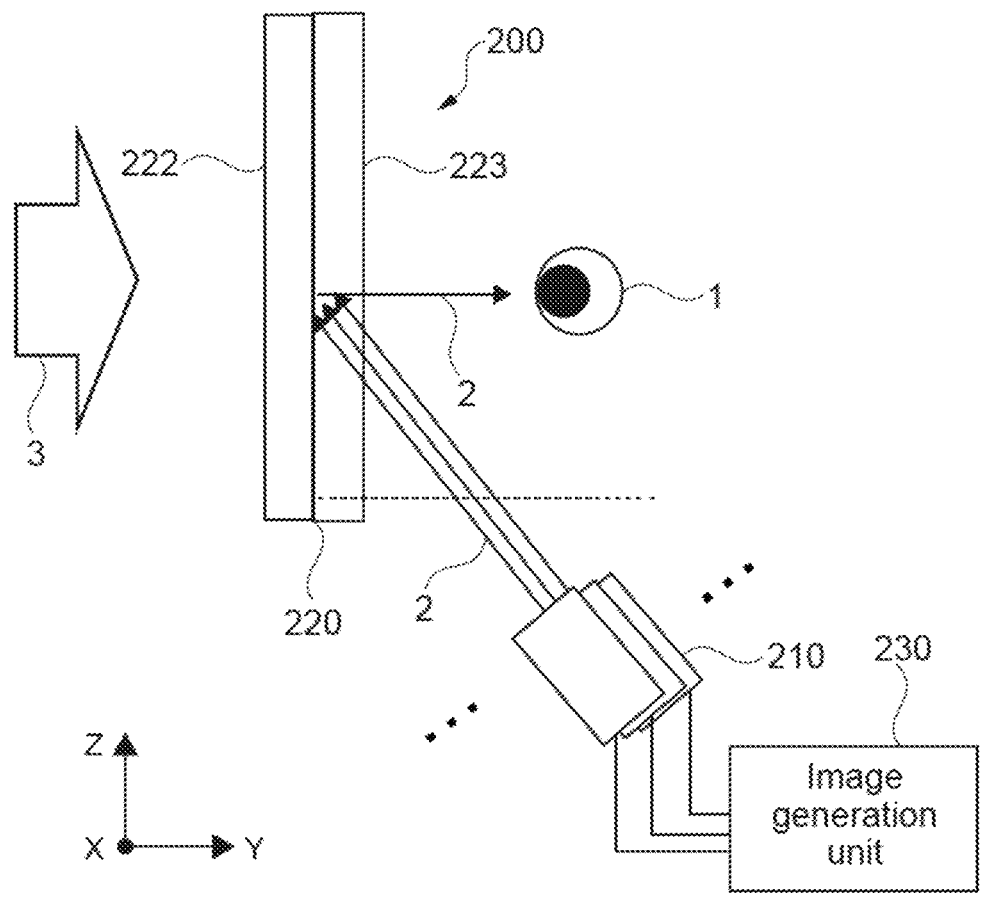
FIG. 17 is a schematic diagram showing a configuration example of an image display apparatus according to a second embodiment.

FIG. 17 is a schematic diagram showing a configuration example of an image display apparatus according to the second embodiment. An image display apparatus 200 includes a plurality of projectors 210, a screen 220, and an image generation unit 230. In the image display apparatus 200, a reflective screen for displaying an image by reflecting projected image light is used as the screen 220. Note that the screen 220 is a transparent screen that transmits background light 3.

As shown in FIG. 17, the screen 220 is configured by attaching a reflective hologram 222 to one surface of a transparent base material 223. Further, the screen 220 is also disposed along the vertical direction with the transparent base material 223 facing the plurality of projectors 210. For example, the image light 2 incident on the screen 220 from the plurality of projectors 210 is diffracted and reflected by the reflective hologram 222, and is diffused and output from the surface (right-side surface in the figure) onto which the image light 2 is projected along the horizontal direction. Therefore, in the image display apparatus 200, the viewpoint image 40 is displayed on the same plane as the plane that is directed to the projectors 210.

Thus, even if the reflective screen 220 is used, it is possible to generate the image data 41 for displaying the viewpoint image 40 on the basis of the direction of the projection axis 11 on the projection reference plane in which the projection axis 11 of each projector 210 is arranged. Note that the reflective screen 220 functions as a mirror surface. Therefore, the image generation unit 230 generates an inverted image in which the viewpoint image 40 to be displayed on the screen 220 is inverted with the left and right reversed, and generates the image data 41 on the basis of the inverted image. The method described with reference to FIGS. 4 to 10 and the like can be applied to the generation of the image data 41.

Third Embodiment

FIG. 18 is a schematic diagram showing a configuration example of an image display apparatus according to a third embodiment. An image display apparatus 300 includes a plurality of projectors 310, a screen 320, and an image generation unit 330. In this embodiment, a Fresnel lens screen including a Fresnel lens element 321 is used as the screen 320. Further, the screen 320 is a transparent screen that transmits background light 3. A of FIG. 18 schematically shows a configuration example of the image display apparatus 300 when the screen 320 is viewed from the side surface (X direction).

The Fresnel lens element 321 has a Fresnel reflecting surface 322 that reflects image light 2 projected from the plurality of projectors 310 along the horizontal direction. Thus, the screen 320 is a reflective screen that reflects the image light 2 to display an image. Note that the present technology is also applicable to the case where a transmissive Fresnel lens element 321 is used.

The angle of the Fresnel reflecting surface 322 is set in accordance with the angle of view or the like of the projector 310, for example, such that the image light 2 incident on each point is output in the horizontal direction. For example, on the lower side of the screen 320, the Fresnel reflecting surface 322 that horizontally reflects the image light 2 incident at a deep angle (angle close to perpendicular) is formed, and on the upper side of the screen 320, a reflecting surface that horizontally reflects the image light 2 incident at a shallow angle is formed. B of FIG. 18 shows an example of a pattern of the Fresnel lens element 321 (Fresnel reflecting surface 322) in the screen 320. The Fresnel reflecting surface 322 is provided so as to concentrically extend from the central portion on the lower side of the screen 320, for example. Note that the present technology is not limited to the case where the image light 2 is reflected in the horizontal direction. For example, the angle of the Fresnel reflecting surface 322 may be appropriately set such that the image light 2 is output at a desired elevation angle.

Using the Fresnel lens element 321 makes it possible to output the image light 2 in the horizontal direction over the entire surface of the screen 320. This makes it possible to display a bright viewpoint image 40 to a user who observes the screen 320 from the horizontal direction. Further, since the elevation angle of the image light output from each point is aligned, it is possible to suppress the luminance unevenness or the like of the viewpoint image 40 displayed on the screen 320.

Fourth Embodiment

FIG. 19 shows schematic diagrams showing a configuration example of an image display apparatus according to a fourth embodiment. An image display apparatus 400 includes a plurality of projectors 410 and a screen 420. In this embodiment, the screen 420 includes a transmissive hologram 422 in which interference fringes 5 are recorded, and is configured to diffract image light 2 projected from each projector 410 at a predetermined angle of view in the horizontal direction. Note that the following description is also applicable to the case where a reflective hologram is used. In this embodiment, the transmissive hologram 422 is an example of a diffractive optical element in which interference fringes are recorded.

A of FIG. 19 and B of FIG. 19 schematically show the configuration example of the image display apparatus 400 when the screen 420 is viewed from the side surface (X direction) and the rear surface (Y direction). As shown in A of FIG. 19, each of the plurality of projectors 410 projects the image light 2 at a vertical angle of view ω centered on the projection axis 11 along the vertical plane (YZ plane)

perpendicular to the screen 420. In the image display apparatus 400, the screen 420 is configured to diffuse and output the image light 2, which is projected at the vertical angle of view ω, at the output elevation angle $\varphi_o$. In FIG. 19, the output elevation angle $\varphi_o$ is set to 0, and the screen 420 is configured to diffract the image light 2 projected at the vertical angle of view ω along the horizontal direction. In this embodiment, the vertical angle of view ω corresponds to a predetermined angle of view.

Specifically, the angle at which the interference fringes 5 are provided (slant angle) is changed along the vertical direction while keeping the pitch of the interference fringes 5 (surface pitch) uniform on the surface of the transmissive hologram 422, so that the interference fringes 5 are recorded in the transmissive hologram 422. At that time, the interference fringes 5 are formed such that the angle formed between the surface of the transmissive hologram 422 and the interference fringes 5 satisfies the Bragg condition with respect to the image light 2. For example, the angle of the interference fringe 5 is formed so as to change continuously in the hologram. This makes it possible to improve the diffraction efficiency over the entire surface of the screen 420. Alternatively, the angle of the interference fringe 5 is formed so as to vary stepwise in the hologram. In this case, for example, even if the positions of the screen 420 and the projector 410 deviate somewhat from the design values, the diffraction efficiency does not change greatly, so it is possible to improve the reliability of the apparatus.

As described above, the interference fringes 5 recorded in the transmissive hologram 422 are multi-slant interference fringes in which the angle is changed along the vertical direction. For example, since the projector 410 has an angle of view, the angle (elevation angle) at which the image light 2 is incident on the top and bottom of the screen 420 is changed. Using the multi-slant interference fringes makes it possible to achieve the diffraction corresponding to the angle of the image light 2 at each position. Thus, it is possible to locally set the diffraction characteristics corresponding to the angle and wavelength of the incident image light 2 at each position in the plane of the screen 420. As a result, it is possible to avoid situations such as changes in brightness and color depending on the place of the screen 420 and it is possible to achieve high-quality image display.

Fifth Embodiment

FIG. 20 shows schematic diagrams showing a configuration example of an image display apparatus according to a fifth embodiment. An image display apparatus 500 includes a plurality of projectors 510, a screen 520, and a free-form mirror 540. In the image display apparatus 500, image light 2 projected from the plurality of projectors 510 is converted into parallel light via the free-form mirror 540, and the image light 2 converted into parallel light is projected on the screen 520. In this embodiment, a transmissive screen 520 is used.

A of FIG. 20 and B of FIG. 20 schematically show the configuration example of the image display apparatus 400 when the screen 520 is viewed from the side surface (X direction) and the rear surface (Y direction). The plurality of projectors 510 is disposed so as to project the image light 2 along the horizontal direction (XY plane), for example. The free-form mirror 540 is disposed obliquely below the screen 520 and reflects the image light 2 projected along the horizontal direction to be incident on the screen 520. The screen 520 is formed by attaching a transmissive hologram 522 to a transparent base material 523. The transmissive hologram 522 is a mono-slant HOE in which interference fringes are formed at a uniform slant angle.

The free-form mirror 540 is an optical element that collimates the image light 2 projected from the plurality of projectors 510 to be incident on the screen 520 at an incident elevation angle $\varphi_i$. Specifically, the free-form mirror 540 collimates the image light 2 such that the incident elevation angle $\varphi_i$ of the image light 2 with respect to the screen 520 is an angle satisfying the Bragg condition in the transmissive hologram 522. The free-form mirror 540 can be designed using a technique such as an optical path simulation. In such a manner, even in the case of the mono-slant fringes 5 of the transmissive hologram 522, the image light can be collimated and projected at an elevation angle (incident elevation angle $\varphi_i$) suitable for the transmissive hologram 522. This makes it possible to sufficiently avoid situations such as changes in brightness and color depending on the place of the screen 520.

Figure 21:
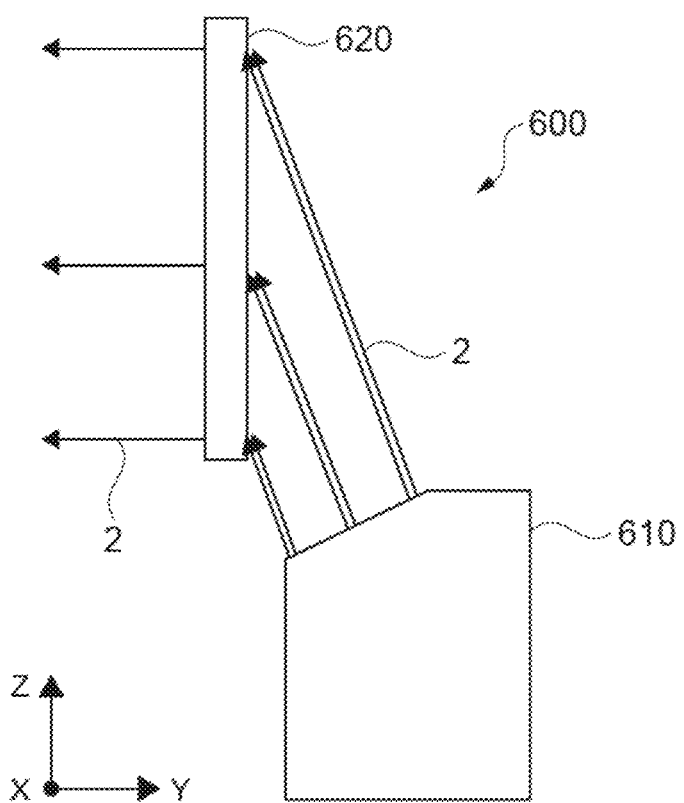
FIG. 21 is a schematic diagram showing another configuration example of an image display apparatus.

FIG. 21 is a schematic diagram showing another configuration example of an image display apparatus. An image display apparatus 600 includes a plurality of projectors 610 and a screen 620. In the image display apparatus 600, an ultra-short focus projector is used as the projector 610. The ultra-short focus projector is a projector capable of performing image projection of a large screen from a short distance through a projection optical system (not shown). For example, using a rectangular display function or the like of the ultra-short focus projector makes it possible to substantially collimate and output the image light 2. Such collimated image light 2 is projected directly onto the screen 620. This makes it possible to suppress the size of the apparatus and to achieve high-quality image display.

Sixth Embodiment

Figure 22:
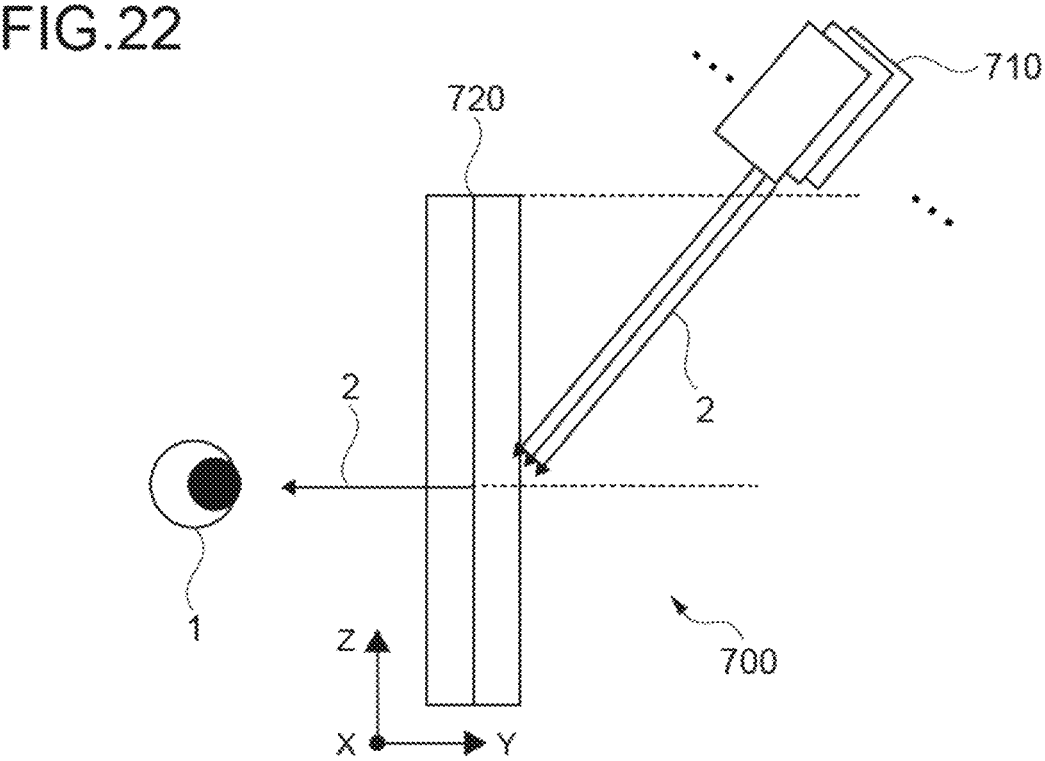
FIG. 22 is a schematic diagram showing a configuration example of an image display apparatus according to a sixth embodiment.

FIG. 22 is a schematic diagram showing a configuration example of an image display apparatus according to a sixth embodiment. An image display apparatus 700 includes a plurality of projectors 710 and a screen 720. In this embodiment, the plurality of projectors 710 is disposed diagonally above the screen 720 disposed along the vertical direction. It can also be said that this configuration is obtained by inverting the top and bottom of the image display apparatus 100 shown in FIG. 1, for example.

The plurality of projectors 710 is disposed above the screen 720 to be outside the angular range in which the viewpoint image 40 is visible, for example, and is configured to project the image light 2 obliquely downward. Providing the plurality of projectors 710 above the screen 720 allows for a configuration such as embedding the projectors 710 in a ceiling portion of an indoor facility, a vehicle, or the like, for example. Thus, it is not necessary to provide a floor surface or the like for placing the apparatus main body, and to improve the degree of freedom of installation of the apparatus, for example.

Seventh Embodiment

Figure 23:
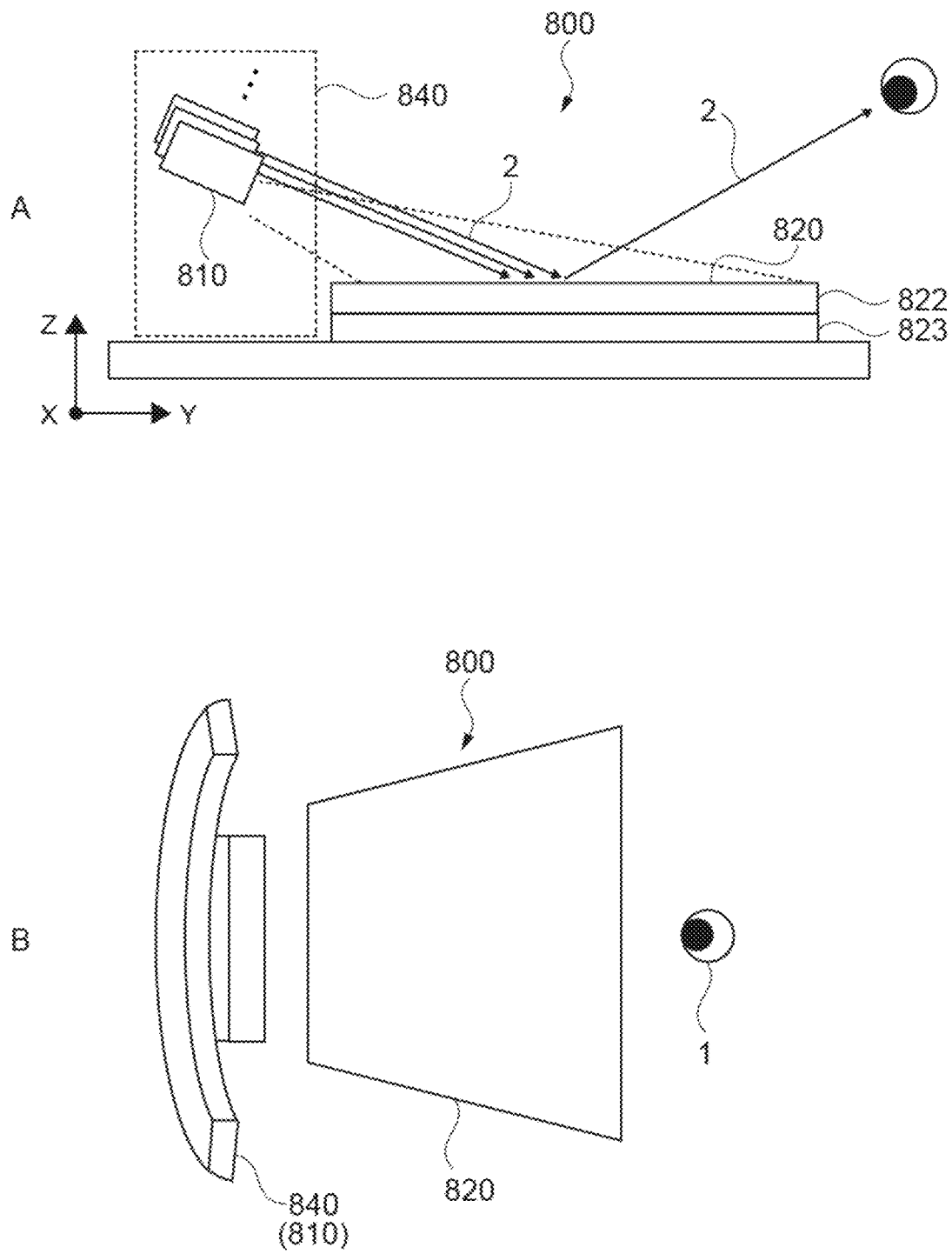
FIG. 23 is a schematic diagrams showing a configuration example of an image display apparatus according to a seventh embodiment.

FIG. 23 shows schematic diagrams showing a configuration example of an image display apparatus according to a seventh embodiment. An image display apparatus 800 includes a plurality of projectors 810, a screen 820, and a housing portion 840. In this embodiment, the screen 820 is disposed along the horizontal direction. A of FIG. 23 and B of FIG. 23 schematically show a configuration example of the image display apparatus 400 when the screen 820 is viewed from the side surface (X direction) and obliquely upward.

As shown in A of FIG. 23, the screen 820 is constituted by attaching a reflective hologram 822 to a transparent base material 823 and is horizontally disposed on an arrangement surface such as a table. The plurality of projectors 810 is housed in the housing portion 840 to project the image light 2 onto the screen 820 from obliquely upward. B of FIG. 23 schematically shows a fan-shaped housing portion 840 that houses the plurality of projectors 810. The image light 2 projected from each projector 810 is diffracted by the screen 820 (reflective hologram 822) and is output obliquely toward the side opposite to the side on which the projectors 810 are provided. In this case, the user can perceive stereoscopic display or the like by obliquely observing the screen 820 from the opposite side of the projectors 810.

As described above, the image display apparatus 800 has a configuration assuming a table-top set configuration, and is an apparatus for achieving stereoscopic display or the like by the screen 820 disposed on the table. This makes it possible to three-dimensionally display what has been viewed on a two-dimensional display target (screen, printed matter, or the like) on a table, for example. For example, a map, design data of cars and buildings, artwork, and the like are three-dimensionally displayed. Further, for example, a video game, a card game, a board game, or the like can be displayed three-dimensionally. In such a manner, stereoscopic display of various objects is made possible, and excellent amusement properties can be exhibited.

Of the feature portions according to the present technology described above, at least two feature portions can be combined. In other words, the various feature portions described in the embodiments may be arbitrarily combined without distinguishing between the embodiments. Further, the various effects described above are not limitative but are merely illustrative, and other effects may be provided.

In the present disclosure, concepts defining shapes, sizes, positional relationships, states, and the like, such as "central", "middle", "uniform", "equal", "same", "perpendicular", "parallel", "symmetric", "extended", "axial", "columnar", "cylindrical", "ring-shaped", and "annular", are concepts including "substantially central", "substantially middle", "substantially uniform", "substantially equal", "substantially the same", "substantially perpendicular", "substantially parallel", "substantially symmetric", "substantially extended", "substantially axial", "substantially columnar", "substantially cylindrical", "substantially ring-shaped", "substantially annular", and the like.

For example, the states included in a predetermined range (e.g., range of ±10%) with reference to "completely central", "completely middle", "completely uniform", "completely equal", "completely the same", "completely perpendicular", "completely parallel", "completely symmetric", "completely extended", "completely axial", "completely columnar", "completely cylindrical", "completely ring-shaped", "completely annular", and the like are also included.

Note that the present technology may also take the following configurations.

(1) An image display apparatus, including:
a plurality of projection units that projects image light corresponding to image data with reference to projection axes thereof and is disposed such that the projection axes face in directions different from each other along a first plane;
a screen that is disposed to intersect with the first plane at a first elevation angle and diffuses and outputs the image light projected along the first plane at a second elevation angle different from the first elevation angle; and
an image generation unit that generates the image data for displaying a plurality of viewpoint images corresponding to viewpoints at which the screen is observed at the second elevation angle on the basis of the directions of the projection axes on the first plane.

(2) The image display apparatus according to (1), in which the image generation unit generates the plurality of viewpoint images corresponding to viewpoints assumed from the directions of the projection axes on the first plane and generates the image data on the basis of the plurality of viewpoint images.

(3) The image display apparatus according to (1) or (2), in which
the image generation unit divides each of the plurality of viewpoint images into partial images and generates, as the image data, a plurality of composite images obtained by combining the corresponding partial images for each of the plurality of projection units.

(4) The image display apparatus according to any one of (1) to (3), in which
the plurality of viewpoint images are images obtained when a display target is seen from observation orientations different from each other with a reference axis as the center, and
the image generation unit sets the observation orientations of the plurality of viewpoint images on the basis of the directions of the projection axes.

(5) The image display apparatus according to (4), in which the image generation unit sets the reference axis to be perpendicular to a second plane that intersects with the screen at the second elevation angle.

(6) The image display apparatus according to (4) or (5), in which
the plurality of projection units is disposed such that the projection axes are radially arranged in the first plane, and
the image generation unit sets an angular interval of the projection axes on the first plane as an angular interval of the observation orientations of the plurality of viewpoint images.

(7) The image display apparatus according to (6), in which the plurality of projection units is disposed such that the angular interval of the projection axes is constant.

(8) The image display apparatus according to (1), in which the screen diffuses the image light at a first diffusion angle along a third plane that defines the first elevation angle and the second elevation angle, and diffuses the image light at a second diffusion angle smaller than the first diffusion angle along a fourth plane perpendicular to the third plane.

(9) The image display apparatus according to (8), in which the screen is configured such that a diffusion distribution of the image light along the fourth plane is a distribution of a top hat shape.

(10) The image display apparatus according to any one of (1) to (9), in which
the screen includes a diffractive optical element or a Fresnel lens element.

(11) The image display apparatus according to any one of (1) to (10), in which
the screen is a transmissive screen or a reflective screen.

(12) The image display apparatus according to any one of (1) to (11), in which the screen is a transparent screen having light transparency.

(13) The image display apparatus according to any one of (1) to (12), in which
the screen is disposed along a vertical direction or a horizontal direction.

(14) The image display apparatus according to (13), in which
the screen is disposed along the vertical direction, and
the second elevation angle is set to an angle indicating the horizontal direction.

(15) The image display apparatus according to any one of (1) to (14), in which
each of the plurality of projection units projects the image light at a predetermined angle of view with the projection axis as the center along a third plane that defines the first elevation angle and the second elevation angle, and
the screen is configured to diffuse and output, at the second elevation angle, the image light projected at the predetermined angle of view.

(16) The image display apparatus according to (15), in which
the screen includes a diffractive optical element in which interference fringes are recorded, and is configured such that pitches of the interference fringes on a surface of the diffractive optical element are uniform and an angle formed by the surface of the diffractive optical element and the interference fringes changes within the diffractive optical element in a continuous or stepwise manner to satisfy a Bragg condition with respect to the image light.

(17) The image display apparatus according to any one of (1) to (16), in which
the plurality of projection units is disposed outside an angular range in which the plurality of viewpoint images displayed on the screen is visible.

(18) The image display apparatus according to any one of (1) to (17), further including
an optical element that collimates the image light projected from the plurality of projection units and makes the image light incident on the screen at the first elevation angle.

(19) The image display apparatus according to (18), in which
the optical element includes a free-form mirror.

REFERENCE SIGNS LIST 1, 1a to 1c viewpoint
2 image light
10, 210, 310, 410, 510, 610, 710, 810 projector
11 projection axis
12 projection reference plane
20, 220, 320, 420, 520, 620, 720, 820 screen
22, 422, 522 transmissive hologram
28 output reference plane
30, 230, 330 image generation unit
40, 40a to 40c viewpoint image
41 image data
55 virtual reference plane
56 display target 44
58 reference axis
100, 200, 300, 400, 500, 600, 700, 800, 900 image display apparatus
222, 822 reflective hologram
321 Fresnel lens element

What is claimed is:

1. An image display apparatus, comprising:
a plurality of projectors that projects image light corresponding to image data with reference to projection axes thereof and is disposed such that the projection axes face in directions different from each other along a first plane;
a screen that is disposed to intersect with the first plane at a first elevation angle and diffuses and outputs the image light projected along the first plane at a second elevation angle different from the first elevation angle;
an image generator that generates the image data for displaying a plurality of viewpoint images corresponding to viewpoints at which the screen is observed at the second elevation angle on a basis of the directions of the projection axes on the first plane; and
an arc shaped free-form mirror that collimates the image light projected from the plurality of projectors, converts the image light into parallel light, and makes the image light incident on the screen at the first elevation angle,
wherein a portion of the arc shaped free-form mirror is provided obliquely under and below the screen in a vertical direction, and
wherein the screen includes a transparent base material attached to a mono-slant transmissive holographic optical element with interference fringes formed at a uniform slant angle that initially receives the parallel light.

2. The image display apparatus according to claim 1, wherein the image generator generates the plurality of viewpoint images corresponding to viewpoints assumed from the directions of the projection axes on the first plane and generates the image data on a basis of the plurality of viewpoint images.

3. The image display apparatus according to claim 1, wherein the image generator divides each of the plurality of viewpoint images into partial images and generates, as the image data, a plurality of composite images obtained by combining the corresponding partial images for each of the plurality of projectors.

4. The image display apparatus according to claim 1, wherein
the plurality of viewpoint images are images obtained when a display target is seen from observation orientations different from each other with a reference axis as a center, and
the image generator sets the observation orientations of the plurality of viewpoint images on a basis of the directions of the projection axes.

5. The image display apparatus according to claim 4, wherein the image generator sets the reference axis to be perpendicular to a second plane that intersects with the screen at the second elevation angle.

6. The image display apparatus according to claim 4, wherein
the plurality of projectors is disposed such that the projection axes are radially arranged in the first plane, and
the image generator sets an angular interval of the projection axes on the first plane as an angular interval of the observation orientations of the plurality of viewpoint images.

7. The image display apparatus according to claim 6, wherein the plurality of projectors is disposed such that the angular interval of the projection axes is constant.

8. The image display apparatus according to claim 1, wherein the screen diffuses the image light at a first diffusion angle along a third plane that defines the first elevation angle and the second elevation angle, and diffuses the image light at a second diffusion angle smaller than the first diffusion angle along a fourth plane perpendicular to the third plane.

9. The image display apparatus according to claim 8, wherein the screen is configured such that a diffusion distribution of the image light along the fourth plane is a distribution of a top hat shape.

10. The image display apparatus according to claim 1, wherein the screen is disposed along a vertical direction or a horizontal direction.

11. The image display apparatus according to claim 10, wherein the screen is disposed along the vertical direction, and the second elevation angle is set to an angle indicating the horizontal direction.

12. The image display apparatus according to claim 1, wherein
   each of the plurality of projectors projects the image light at a predetermined angle of view with the projection axis as a center along a third plane that defines the first elevation angle and the second elevation angle, and
   the screen is configured to diffuse and output, at the second elevation angle, the image light projected at the predetermined angle of view.

13. The image display apparatus according to claim 1, wherein the plurality of projectors is disposed outside an angular range in which the plurality of viewpoint images displayed on the screen is visible.

14. An electronic device, comprising:
   an optical system;
   an image display apparatus that receives light from the optical system, the image display apparatus, including:
   a plurality of projectors that projects image light corresponding to image data with reference to projection axes thereof and is disposed such that the projection axes face in directions different from each other along a first plane;
   a screen that is disposed to intersect with the first plane at a first elevation angle and diffuses and outputs the image light projected along the first plane at a second elevation angle different from the first elevation angle;
   an image generator that generates the image data for displaying a plurality of viewpoint images corresponding to viewpoints at which the screen is observed at the second elevation angle on a basis of the directions of the projection axes on the first plane; and
   an arc shaped free-form mirror that collimates the image light projected from the plurality of projectors, converts the image light into parallel light, and makes the image light incident on the screen at the first elevation angle,
   wherein a portion of the arc shaped free-form mirror is provided obliquely under and below the screen in a vertical direction, and
   wherein the screen includes a transparent base material attached to a mono-slant transmissive holographic optical element with interference fringes formed at a uniform slant angle that initially receives the parallel light; and
   a processor that processes signals received from the image display apparatus.

15. The electronic device according to claim 14, wherein the image generator generates the plurality of viewpoint images corresponding to viewpoints assumed from the directions of the projection axes on the first plane and generates the image data on a basis of the plurality of viewpoint images.

16. The electronic device according to claim 14, wherein the image generator divides each of the plurality of viewpoint images into partial images and generates, as the image data, a plurality of composite images obtained by combining the corresponding partial images for each of the plurality of projectors.

17. The electronic device according to claim 14, wherein the image generator generates the plurality of viewpoint images corresponding to viewpoints assumed from the directions of the projection axes on the first plane and generates the image data on a basis of the plurality of viewpoint images.

18. The electronic device according to claim 14, wherein the plurality of viewpoint images are images obtained when a display target is seen from observation orientations different from each other with a reference axis as a center, and
   the image generator sets the observation orientations of the plurality of viewpoint images on a basis of the directions of the projection axes.

19. The electronic device according to claim 18, wherein the image generator sets the reference axis to be perpendicular to a second plane that intersects with the screen at the second elevation angle.

20. The electronic device according to claim 18, wherein the plurality of projectors is disposed such that the projection axes are radially arranged in the first plane, and
   the image generator sets an angular interval of the projection axes on the first plane as an angular interval of the observation orientations of the plurality of viewpoint images.

* * * * *